(12) United States Patent
Edelson

(10) Patent No.: US 6,922,037 B2
(45) Date of Patent: Jul. 26, 2005

(54) ROTATING INDUCTION APPARATUS

(75) Inventor: Jonathan Sidney Edelson, Somerville, MA (US)

(73) Assignee: Borealis Technical Limited, Gibraltar (GI)

( * ) Notice: Subject to any disclaimer, the term of this patent is extended or adjusted under 35 U.S.C. 154(b) by 93 days.

(21) Appl. No.: 10/374,851

(22) Filed: Feb. 25, 2003

(65) Prior Publication Data

US 2003/0173931 A1 Sep. 18, 2003

Related U.S. Application Data

(63) Continuation-in-part of application No. 09/255,291, filed on Feb. 22, 1999, now Pat. No. 6,570,361.
(60) Provisional application No. 60/360,157, filed on Feb. 25, 2002, and provisional application No. 60/360,215, filed on Feb. 25, 2002.

(51) Int. Cl.$^7$ ............................................. H02P 7/628
(52) U.S. Cl. ..................... 318/801; 318/290; 318/452; 318/484; 388/921
(58) Field of Search ................................ 318/138, 254, 318/290–294, 439, 720–724, 798–801, 629, 445, 452, 484; 388/921

(56) References Cited

U.S. PATENT DOCUMENTS

| | | |
|---|---|---|
| 1,356,933 A | 10/1920 | Macmillan |
| 1,427,360 A | 8/1922 | Chubb |
| 3,127,548 A | 3/1964 | Emden |
| 3,453,512 A | 7/1969 | Polakowski |
| 3,462,667 A | 8/1969 | Jackson |
| 3,584,276 A | 6/1971 | Ringland et al. |
| 3,603,866 A | 9/1971 | Opal |
| 3,611,104 A | 10/1971 | Jalal et al. |
| 3,641,417 A | 2/1972 | Gyugyi |
| 3,663,877 A | 5/1972 | Clark |
| 3,713,504 A | 1/1973 | Shimer et al. |

(Continued)

FOREIGN PATENT DOCUMENTS

| | | |
|---|---|---|
| GB | 2 123 225 A | 1/1984 |
| WO | WO 96/18287 A | 6/1996 |
| WO | WO 00/51229 A | 8/2000 |

OTHER PUBLICATIONS

Abbas, M. et al. "Characteristics of a High–Power Density Six–Phase Induction Motor" *Conference Record of the Annual Meeting of the IEEE Industrial Applications Society*, vol. 19, pp 494–502, 1984.

Abbas, M. et al. "Six–Phase Voltage Source Inverter Driven Induction Motor" *Conference Record of the Annual Meeting of the IEEE Industrial Applications Society*, vol. 18, pp 503–511, 1983.

Drozdowski, P. "Equivalent Circuit and Performance Characteristics of 9–Phase Cage Induction Motor" ICEM'94, Paris, France, vol. 1, pp 118–123 (1984).

(Continued)

*Primary Examiner*—Bentsu Ro

(57) ABSTRACT

An electrical rotating apparatus comprises an inverter system that outputs more than three phases. The apparatus further includes a stator electrically coupled to the inverter system, and a rotor electromagnetically coupled to a magnetic field generated by the stator. A signal generator generates a pulse modulated drive waveform signal, that has a frequency synchronized with the rotational frequency of the rotor, and the pulse modulated drive waveform signal drives the inverter system. The pulse modulated drive waveform signal has a pulsing frequency. Additionally, the inverter system may be fed by a pulse modulated drive waveform signal that is fed through at least one signal delay device. Alternatively, the system may also be fed selected harmonic components, such as the third harmonic, up until the number of phases in the apparatus.

94 Claims, 12 Drawing Sheets

U.S. PATENT DOCUMENTS

| | | | |
|---|---|---|---|
| 3,781,615 A | | 12/1973 | Mokrytzki et al. |
| 3,832,625 A | | 8/1974 | Gyugyi |
| 3,908,130 A | | 9/1975 | Lafuze |
| 3,917,988 A | | 11/1975 | Payne |
| 4,013,937 A | | 3/1977 | Pelly et al. |
| 4,023,083 A | | 5/1977 | Plunkett |
| 4,093,869 A | | 6/1978 | Hoffmann et al. |
| 4,161,680 A | | 7/1979 | Akamatsu |
| 4,218,646 A | | 8/1980 | Akamatsu |
| 4,328,454 A | | 5/1982 | Okuyama et al. |
| 4,352,155 A | | 9/1982 | Gyugyi |
| 4,456,865 A | | 6/1984 | Robertson, Jr. et al. |
| 4,476,422 A | | 10/1984 | Kirschbaum |
| 4,484,127 A | | 11/1984 | Salihi et al. |
| 4,626,750 A | | 12/1986 | Post |
| 4,651,079 A | | 3/1987 | Wills |
| 4,739,239 A | * | 4/1988 | Krause et al. ............... 318/685 |
| 4,749,933 A | | 6/1988 | ben-Aaron |
| 4,751,448 A | | 6/1988 | Auinger |
| 4,833,588 A | | 5/1989 | Schauder |
| 4,849,871 A | | 7/1989 | Wallingford |
| 4,912,379 A | * | 3/1990 | Matsuda et al. ............ 318/254 |
| 4,914,335 A | | 4/1990 | Horton et al. |
| 4,928,051 A | | 5/1990 | Demeter et al. |
| 5,070,291 A | | 12/1991 | Nakamura et al. |
| 5,075,610 A | | 12/1991 | Harris |
| 5,107,410 A | | 4/1992 | Marsh et al. |
| 5,111,095 A | * | 5/1992 | Hendershot ................ 310/168 |
| 5,129,328 A | | 7/1992 | Donnelly |
| 5,194,796 A | | 3/1993 | Domeki et al. |
| 5,198,741 A | | 3/1993 | Shinada et al. |
| 5,198,972 A | | 3/1993 | Lafuze |
| 5,216,339 A | | 6/1993 | Skybyk |
| 5,294,875 A | | 3/1994 | Reddy |
| 5,298,848 A | | 3/1994 | Ueda et al. |
| 5,334,898 A | | 8/1994 | Skybyk |
| 5,365,158 A | | 11/1994 | Tanaka et al. |
| 5,394,321 A | | 2/1995 | McCleer et al. |
| 5,552,640 A | | 9/1996 | Sutton et al. |
| 5,661,379 A | | 8/1997 | Johnson |
| 5,786,673 A | | 7/1998 | Johnson |
| 5,808,440 A | | 9/1998 | Bennett et al. |
| 6,049,152 A | | 4/2000 | Nakano |
| 6,054,837 A | | 4/2000 | Edelson |
| 6,348,775 B1 | * | 2/2002 | Edelson et al. ............. 318/727 |
| 6,426,605 B1 | * | 7/2002 | Toliyat et al. .............. 318/801 |
| 6,469,463 B2 | * | 10/2002 | Chen et al. ................. 318/439 |
| 6,570,361 B1 | | 5/2003 | Edelson |

OTHER PUBLICATIONS

Klingshirn, E. "High Phase Order Induction Motors–Part I–Description and Theoretical Considerations" IEEE Transactions on Power Apparatus and Systems, vol. PAS–102, No. 1, pp 47–59, Jan. 1983.

Koseki, T. et al. "Novel Linear Induction Drives: Control Scheme and Converters" 4th European Conf. EPE'91, Florence, vol. 1, pp 481–486 (1991).

Lee, C. et al. "Effects of Nonsinusoidal Voltage on the Operation Performance of a Three–phase Induction Motor" IEEE Transactions on Energy Conversion, vol. 14, No. 2, pp 193–201, Jun. 1999.

Pessina, G. et al. "Boundaries in Multispeed A.C. Systems" Proceedings of International Conference "Evolution and Modern Aspects of Induction Machines" Torino Italy, pp 224–231 (1986).

Pessina, G. et al. "Two Speed Commutated 5–Phase Induction Motor" Proceedings of ICEM'86, Munchen Germany, vol. 1, pp 199–202 (1986).

Sobczyk, T. et al. "Steady–State Equations of Multiphase Squirrel–Cage Induction Motors" Proceedings of ICEM'86, Munchen Germany, vol. 2, pp 393–396 (1986).

Toliyat, H. et al. "Analysis of a Concentrated Winding Induction Machine for Adjustable Speed Drive Applications Part 1 (Motor Analysis)" IEEE Transactions on Energy Conversion, vol. 6, No. 4, pp 679–692, Dec. 1991.

* cited by examiner $$\int_0^{180} \frac{F(x)}{180} dx = 0.637$$

$$\int_0^{180} \frac{G(x)}{180} dx = 0.707$$

$$\int_0^{180} \frac{1.061 \cdot G(x)}{180} dx = 0.751$$

$H(x) := \sin(rad(x)) + \frac{1}{3} \cdot (\sin(3 \cdot rad(x)) \cdot abs(\sin(rad(x))))$ $Ha_x := H(x)$ $\max(Ha) = 0.895$

ROTATING INDUCTION APPARATUS

CROSS-REFERENCE TO RELATED APPLICATIONS

This application claims the benefit of U.S. Provisional Application Nos. 60/360,157 and 60/360,215, both filed 25 Feb. 2002. This is a continuation-in-part of application Ser. No. 09/255,291, filed 22 Feb. 1999 now U.S. Pat. No. 6,570,361. This application is related to application Ser. No. 09/713,654, filed 15 Nov. 2000, now U.S. Pat. No. 6,657,334, which claims the benefit of U.S. Provisional Application No. 60/242,622, filed 23 Oct. 2000. This application is also related to application Ser. No. 08/715,482, filed 18 Sep. 1996, now U.S. Pat. No. 6,054,837, which is a continuation-in-part of application Ser. No. 08/350,737, filed 7 Dec. 1994, and now abandoned, which is a continuation-in-part of application Ser. No. 08/267,043, filed 28 Jun. 1994, and now abandoned.

BACKGROUND OF THE INVENTION

This invention relates generally to rotating induction apparatus and more specifically to more efficient rotating induction apparatus. It relates to pulse width modulation (PWM), and the synthesis of desired alternating current for motor drive applications.

Electric motors in operation make use of the fact that a current of charge in a magnetic field will experience a force perpendicular to both the current and the field. In the case of the AC induction motor, a set of energized windings, the stator windings, produce a rotating magnetic field. This rotating magnetic field induces current in a set of rotatable windings, the rotor windings. Additionally, this rotating magnetic field interacts with the rotor current, and causes the rotor to turn. Ideally, the rotating magnetic field will have a fixed spatial structure, simply changing orientation at a suitable rate.

In a three-phase induction motor, the magnetic field has a sinusoidal distribution. This means that on a particular point on the interface between the rotor and the stator, also known as the 'air gap', the magnetic flux density will be zero. Continuing along the airgap, the magnetic flux density will climb to a peak, and then drop back down to zero, then climb to a negative peak, and then return to zero. A graph of the flux density versus air gap position would be a sine wave.

The greater the flux density, the greater the torque produced by a given current in the rotor windings. As resistance losses scale with the square of current flow in the windings, the greater the flux density, the lower the resistance losses in the motor. The production of the magnetic flux itself requires current flow, thus there is an ideal maximum flux density for a given operation which minimizes total current flow.

AC induction motors make use of ferromagnetic materials to increase the flux density produced by a given magnetizing current flow. By reducing the current levels needed to produce high flux densities, machine efficiency and performance are greatly enhanced. One difficulty is introduced by the fact that ferromagnetic materials do not have a linear relation between magnetizing current flow and flux densities produced. Specifically, ferromagnetic materials exhibit 'saturation', in which increases in magnetizing current produce only slight increases in flux density. Because of the sinusoidal flux distribution used in three phase motors, a portion of the ferromagnetic materials will be near saturation while the majority of the ferromagnetic materials will be well below saturation.

The rotating field produced by the stator windings is complex and irregular. By the principal of superposition, the rotating field may be analyzed as being composed of numerous rotating fields of different shape, including a fundamental or desired lowest frequency structure. The rotating field is composed of this fundamental field and higher frequency harmonic fields.

The excitation currents may similarly be complex, and may be analyzed as being composed of several different harmonic currents. The fundamental excitation current is the primary source of torque.

Spatial harmonics, or air-gap harmonics, are harmonic fields generated by the non-sinusoidal nature of the field generated by each winding. When spatial harmonics are excited by the fundamental drive currents, they produce a secondary rotating field that rotates slower than the fundamental field. For a given excitation frequency, spatial harmonic fields rotate more slowly than the fundamental field.

Harmonic fields generated by non-sinusoidal drive waveforms are termed temporal harmonics. Rotating fields produced by temporal harmonic currents rotate more rapidly than the fundamental field. When temporal harmonics excite the fundamental spatial field, they produce a secondary rotating field that rotates more rapidly than the fundamental field and may rotate in the opposite direction to the fundamental field.

Therefore, both spatial and temporal harmonics in rotating fields may adversely affect the efficiency of a conventional rotating induction apparatus, lowering torque and increasing current flow.

Early three phase motors used inverters known as six step inverters, to synthesize sine waves for two or three phases. These inherently had a fixed number of pulses per cycle, and often worked with the commutation of one phase on, at the same time rendered a second phase "off". Improvements to this inverter resulted in the 18-step inverter, which offered greater accuracy, but similarly, each cycle was locked to containing 18 steps. By the way the system was designed, there was a fixed number of pulses per cycle.

More recently, Pulse Width Modulation (PWM) has become the norm, in which a fixed pulses are modulated for each phase to achieve a desired sinusoid.

Usage of pulse width modulation (PWM) in the synthesis of electrical power for motor drive use has certain limitations. Firstly, in order to calculate a desired output amplitude, a base PWM frequency is used, and for each PWM period, the controller uses a technique to calculate the desired output amplitude, to synthesize a desired sine wave, relative to the PWM frequency used.

The amplitude may be selected using table look-up techniques, or using transforming techniques, etc. However, in general, the PWM frequency is fixed, (or independently adjustable,) and remains fixed during motor operation. Sometimes, the PWM frequency may be adjusted, such as by a potentiometer, but this is without any synchronization with the actual waveform frequency at the time.

The problem with this approach is that along with the synthesis of the desired output, there is a substantial amount of random noise, caused by the pulsing carrier wave, which reduces the fidelity of the output.

Another issue common to PWM, is the limitations inherent in sine look-up tables. The PWM controller synthesizes current of a desired output, sometimes by calculating the sine of angles, but usually with reference to a sine look-up table. When calculation is used, no angle error is introduced into the value. However, look up tables often incur substantially less computational expense, and permit the synthesis of complex waveforms.

Look-up tables commonly contain 2 to the power of n entries. When the angle for which a sine is desired happens to correspond exactly to one of the sine table entries, then the correct sine value is returned. For all other angles, an error is introduced. The extent of error to which sines are subject to is largely related to the number of entries in the look-up table. As the number of entries increase, the error is reduced, however this uses additional computational resources. In, for example, a 256 entry sine look-up table, the maximum error will be $\frac{1}{512}$ of a cycle, with the average error on the order of $\frac{1}{1024}$ of a cycle. The error is essentially uncorrelated, and will in general be different for each phase of a polyphase system. This causes a phase imbalance.

BRIEF SUMMARY OF THE INVENTION

From the foregoing, it may be appreciated that a need has arisen for a more efficient rotating induction apparatus that is tolerant of harmonics.

In one embodiment of the present invention, an electrical rotating apparatus comprises: an inverter system that outputs more than three phases; a stator comprising windings, which are electrically coupled to the inverter system; a rotor electromagnetically coupled to the magnetic field generated by the windings; and a signal generator driving the inverter system which generates a pulse modulated drive waveform signal having a pulsing frequency. The drive waveform signal is modulated, so that the modulation and the pulsing frequency produce superimposed rotating magnetic fields, and the rotating magnetic field produced by the pulsing frequency is synchronized with the rotation frequency of the rotor.

In a further embodiment the present invention comprises a method of operating an electrical rotating apparatus comprising: providing an inverter system that outputs more than three phases; electromagnetically coupling a rotor to a magnetic field generated by windings; generating a pulse modulated drive waveform signal with a pulsing frequency from a signal generator; and driving the inverter system with the pulse modulated drive waveform signal. A rotational magnetic field produced by the pulsing frequency is synchronized with a rotating frequency of the rotor.

In another embodiment of the present invention, an electrical rotating apparatus comprises: an inverter system that outputs more than three phases; a stator comprising windings, which are electrically coupled to the inverter system; a rotor electromagnetically coupled to the magnetic field generated by the stator; and a signal generator driving the inverter system which generates a pulse modulated drive waveform signal having a desired output and a pulsing distortion. The drive waveform signal produces a rotating magnetic field comprising two superimposed rotating magnetic fields, one of which is caused by the pulsing distortion, and is synchronized with a rotating frequency of the rotor.

In a further embodiment of the present invention, selected harmonic components are introduced into the system to allow an increase in the amplitude of the fundamental drive waveform for the same peak amplitude. Harmonic components are related to the fundamental, both by frequency and by phase.

In a further embodiment of the present invention, an electrical rotating apparatus comprises: an inverter system that outputs more than three phases; a stator a stator comprising a plurality of slots and full span concentrated windings, which are electrically coupled to the inverter system; a rotor electromagnetically coupled to the magnetic field generated by the stator; and a signal generator driving the inverter system which generates a drive waveform signal. The drive waveform signal has a fundamental frequency and a pulsing frequency that is in fixed phase relation to the fundamental frequency. In a further embodiment, the apparatus additionally comprises a means for synchronizing the pulsing frequency of the fundamental frequency.

A technical advantage of the present invention is that it substantially reduces the problems associated with harmonic rotating fields. Another technical advantage of the present invention is that it may employ pulse modulated signals (PM). Further, utilizing certain frequencies of the PM may provide improved apparatus performance.

A further technical advantage is that a single pulse modulated pulse modulated drive waveform signal may be employed to drive all inverters, as opposed to employing multiple, independent pulse modulated drive waveform signals.

Yet another technical advantage is that the present invention facilitates operation in the non-linear region of the saturation curve, or operation at densities greater than about 130,000 lines per square inch (2.02 Tesla). Because the torque varies as the square of the magnetic field strength, operation at high saturation levels substantially increases available torque and motor performance during starting.

Still another technical advantage of the present invention is that it may beneficially use non-sinusoidal drive waveforms produced by slow switching elements. The inverter may also use flexible component sizes, and, therefore, facilitate cheaper per unit capacity power semiconductors.

An additional technical advantage of the present invention is that synchronizing the pulsing frequency with a rotating frequency of the rotor decreases rotor heating.

Yet another technical advantages of the present invention is that additional harmonics may be added as needed to increase the amplitude of the fundamental drive waveform for the same peak amplitude, using up to the harmonic equal to the phase count.

Another technical advantage of the present invention is that a mesh connection may be used.

From the foregoing, it may also be appreciated that there is need for lower noise PWM synthesis of desired output. The present invention discloses that when the PWM frequency is a multiple of the desired output frequency, the noise in the output is greatly reduced. Furthermore, it is clear that the phase imbalance caused by look-up table errors must be reduced. The present invention discloses that this phase imbalance may be eliminated by correlating the number of entries in the sine table with the number and locations of the slots for which the PWM is being synthesized.

In accordance with the present invention, a method and apparatus are provided for improving the functionality of the PWM to synthesize electrical waveforms having both required amplitude and a suitable frequency. It is an advantage of the present invention that greater fidelity of the output may be achieved. It is an advantage of the present invention that noise is reduced. Furthermore, it is an object of the present invention to provide a sine look-up table which includes values with zero error, resulting in the combined output of the phases being more balanced.

It is an advantage of the present invention to eliminate the averse effect of phase imbalance, caused by error values in sine look-up tables.

It is an advantage of the present invention to increase the fidelity of the output due to the synchronizing of the error values with the number of slots in the machine.

It is an advantage of the two techniques mentioned above that PWM performance is greatly enhanced.

Other technical advantages of the present invention are set forth in or will be apparent from drawings and the description of the invention that follows, or may be learned from the practice of the invention.

BRIEF DESCRIPTION OF THE SEVERAL VIEWS OF THE DRAWING

For a more complete explanation of the present invention and the technical advantages thereof, reference is now made to the following description and the accompanying drawings, wherein like reference numerals represent like parts, in which.

DETAILED DESCRIPTION OF THE INVENTION

Figure 1:
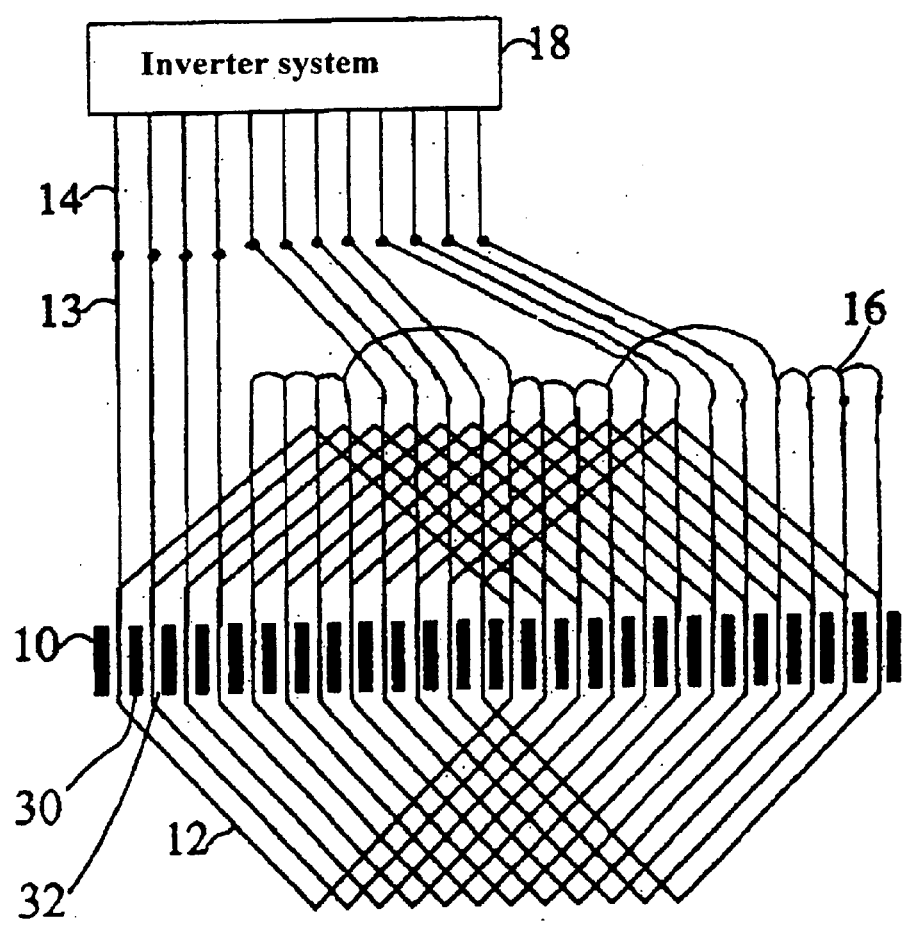
FIG. 1 illustrates a schematic of the windings of an induction apparatus of the present invention.

Embodiments of the present invention and their technical advantages may be better understood by referring to FIGS. 1 though 10, like numerals referring to like and corresponding parts of the various drawings.

The present invention may utilize multiple, i.e., more than three, independently driven phases. Preferably, the apparatus uses twelve or more phases. Alternatively, the apparatus uses eighteen or more phases. The present invention may be constructed on a standard induction motor frame.

High Phase Order Machines

FIG. 1 illustrates a schematic of the windings of an induction apparatus of the present invention. FIG. 1 depicts a stator 10 and inverter system 18. Inverter system 18, depicted in FIG. 1, uses half bridge inverters, however, the present invention may utilize either half or full bridge inverters. Stator 10 includes stator teeth 30 and slots 32. Coils 12 pass through slots 32.

Inverter system 18 is comprised of a plurality of inverters, such that the number of inverters is equal to the number of phases desired. If inverter system 18 uses half bridge inverters, one winding end of each coil 12 is coupled to coil end lead 13 and is in turn coupled to lead 14. Lead 14 is coupled to an inverter in inverter system 18. The other winding end of each coil 12 is coupled to a star point 16. Each coil thus has a driven end, which is the end that is coupled to the inverter system, and a back end, which is the end that is coupled to star point 16.

If a full bridge system was being used, each end of coil 12 would be coupled to a coil end lead 13, and none of the coils would be connected to a star point 16. When using a star point 16, or a neutral point, the number of half bridges is halved. To accomplish this in the present invention, each winding has two ends or terminations. Rather than connecting an inverter to each end and driving the ends with 180-degree phase difference, an inverter is connected to one winding end 13, and the other winding end is connected to star point 16. When the net current at star point 16 is zero, the voltage at star point 16 will be constant, and the winding will be energized properly.

To achieve the state in which net current at star point 16 is zero, the driven winding ends may be selected to have electrical angles that either divide 360 degrees evenly, or be selected in independent subsets that divide 360 degrees evenly. For example, with a twenty-four slot stator spanning slots 1:13, twenty-four coil ends may be used, with coil ends (driven ends) 1, 2, 4, 7, 9, 10, 12, 15, 17, 18, 20, and 23 connected to a twelve phase inverter via leads and coil ends (back ends) 3, 5, 6, 8, 11, 13, 14, 16, 19, 21, 22, and 24 connected to a star point. Alternatively, in an 18 phase system, ends 1, 2, 5, 6, 9, 10, 13, 14, 17, 18, 21, 22, 25, 26, 29, 30, 33, 34 are driven and the other ends are connected at a star point. Alternatively still, a mesh connection may be used to drive winding ends 1 and 3 with a phase of 0°, and then going around the stator driving two ends at a time.

The selected driven winding ends are fed with current with a phase difference that matches the electrical angles of the windings. It is noted that the electrical angle between any two windings in the stator matches the electrical phase angle between the AC power supplying those windings. The electrical phase angle is the time offset in the drive waveform between different phases, measured in degrees relative to a full cycle of the drive waveform. The electrical angle is the actual physical angle of the winding, relative to a complete cycle (zero to North to zero to South to zero) of the magnetic field. For example, in a two pole apparatus, the electrical angle is the actual physical angle. For a four-pole stator, there are two magnetic cycles around the physical stator, thus the electrical angle is twice the physical angle. For a six-pole stator, there are three magnetic cycles, thus, the electrical angle is thrice the physical angle. Accordingly, for a 2N pole stator, the electrical angle spanned is N multiplied by the physical angle. Having the electrical phase angle of the supplied alternating current match the electrical angle of the winding provides proper high phase order drive for the stator winding.

In addition to dividing 360 degrees evenly, the selected winding sets may contain an odd number of phases. If an even number of phases is selected, the pairs of phases have a 180-degree phase difference; such pairs of phases then are single phases driven by a full bridge, which eliminates the benefit of star point 16. For example, with a 30-slot stator having 15 windings each spanning 180 degrees or opposing slots, the electrical angle between each slot is 12 degrees. Because there are 30 winding ends, each set of winding ends may be driven 24 degrees apart, which evenly divides the full 360 degrees, resulting in a symmetric drive with zero net current at star point 16.

Alternatively, for a 30-slot stator, 5 subsets of 3 windings each, may be used, with each of the winding ends being 120 degrees apart. Each subset is symmetrically driven, so that the 5 subsets together also are symmetrically driven. Any arrangement of these 5 subsets would be symmetrically driven, even if there is not regular, or irregular, angular spacing between the subsets.

The term winding may include a single stator conductor extending the length of a single slot. To use coiled windings which encompasses two slots, such windings consist of wires that travel down one slot, around a stator end, up another slot, and then again around the stator end back to the first slot. When current is flowing in one direction through one slot, it is flowing in the opposite direction through the other slot. Considering the two slots independently, the two sides of the winding are driven with AC that is exactly 180° out of phase. Thus, any stator, which makes use of windings of at least a single turn, has pairs of slots that are 180 electrical degrees apart. Opposite halves of the same winding are placed in magnetically opposite slots, i.e., slots that are 180 electrical degrees apart.

Figure 2:
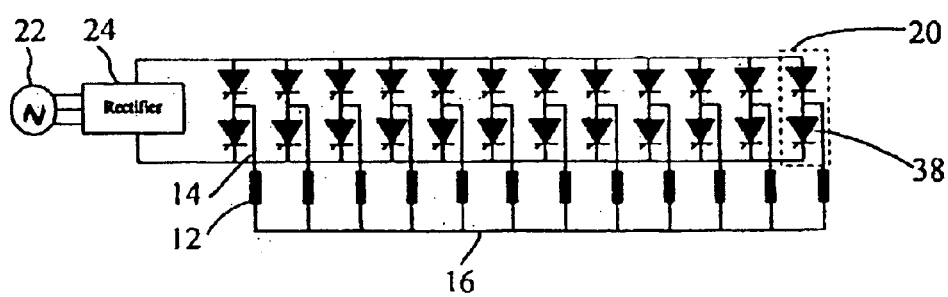
FIG. 2 illustrates a schematic of a twelve phase DC link inverter drive system using half bridge drive for each phase.

FIG. 2 illustrates a schematic of a twelve-phase DC link inverter drive system using half bridge drive for each phase. An AC power supply 22 supplies a rectifier 24. Rectifier 24 supplies DC power to half bridges 20. Each half bridge 20 includes two controlled switches 38. Controlled switches 38 may, for example, be transistors. The apparatus depicted in FIG. 2 depicts twelve half bridges 20; the dashed outline of half bridge 20 is omitted from all but the last inverter for purposes of simplifying the figure.

A twelve phase DC link inverter drive system is depicted; thus there are twelve half bridges 20. Half bridges 20 alternately switch their output between the positive and negative DC supply. This synthesizes an alternating current output. The alternating current output is fed, via leads 14, to windings 12.

The DC voltage used in the inverter system is known as the DC rail voltage. In comparison with a full bridge system, a half bridge inverter system uses half the number of transistors, and, for the same DC rail voltage, applies half the voltage to each winding. Thus, in comparison with a half bridge system, a full bridge inverter system uses twice the number of transistors, and, for the same DC rail voltage, applies twice the voltage to each winding.

Further, the half bridge drive may use various symmetries. For example, windings may be grouped in balanced three phase sets. A full bridge system does not need this symmetry, because the full bridge system is intrinsically symmetric. Moreover, the full bridge system places the full DC rail voltage on the windings, which results in the same current flow delivering twice the power to the windings, in comparison with the half bridge.

The present invention may be configured with either full or half bridge inverters depending on cost concerns. For example, if smaller, less expensive and less powerful transistors are desired, full bridge inverters may be used. However, if it is more cost effective to use half the number of more powerful transistors, than half bridge inverters may be more economical to use.

Figure 3:
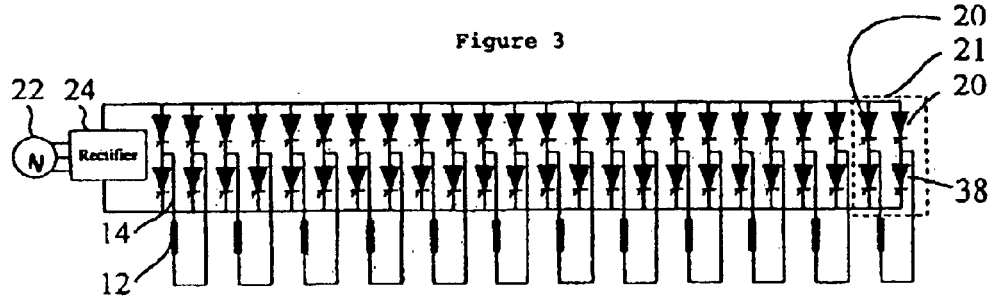
FIG. 3 illustrates a schematic of a twelve phase DC link inverter drive system using full bridge drive for each phase.

FIG. 3 illustrates a schematic of a twelve phase DC link inverter drive system using full bridge drive for each phase. In this example, two half bridge 20 elements, each including two controlled switches 38, act together as a single full bridge element 21. Further, in this example, a twelve phase DC link inverter drive system is depicted, thus there are twelve full bridges 21. The present invention includes greater than three phases, and would have a number of full bridges 21 equal to the number of windings. Because a full bridge is comprised of two half bridges, and each winding has a half bridge at each end, the number of half bridges used with a full bridge system is equal to twice the number of phases. Further, the apparatus depicted in FIG. 3 depicts twelve full bride inverters 21; the dashed outline of full bridge 21 is omitted from the all but the last full bridge inverter to simplify the figure.

Full bridges 21 supply AC power to both ends of winding 12. Thus, using full bridges 21 doubles the power handling capacity of the device, and removes the need for a star point.

Referring again to FIG. 1, stator 10 of the present invention may include a number of features. For example, stator 10 may include pole/phase groups that utilize a single slot. A pole/phase group is the winding that comprise one phase in one pole. Further, stator 10 may include a winding distribution factor of 1, or about 1, wherein the windings are distributed across the width of a single slot.

Moreover, full span windings are used in stator 10. A full span winding is a winding that stretches across 180 electrical degrees of the stator, and thus maximally interacts with the rotating field. Full span winding provides a chording factor of 1, or about 1. Such windings include a single coil in a single slot pair. Therefore, the full phase voltage is applied to a single coil, necessitating high turn counts such as with a parallel connected three phase apparatus. Consequently, each phase carries a fraction of the entire supply current. Further, the phase angle for any phase depends on the electrical angle of the phase winding associated with the phase.

Thus, in general, the present invention includes multiple phase windings with full phase voltage, or a large fraction thereof, applied to each coil. Full pitch windings may also be used, and in general, adjacent coils do not have to be connected together to form phase bands (pole/phase groups).

In three phase designs, the phase angle between adjacent phases is 120°, with phase belts (phase bands) being placed 120° electrical degrees apart in the stator winding. In the present invention, the phase angle of the alternating current supplied by a given inverter output phase is arbitrary, and defined by the inverter control system. The phase angle between the alternating current supplied to any two phases is simply made to be equal to the electrical angle between the coils driven by the phases. This electrical angle need not subdivide the stator evenly.

For example, a twelve phase, two pole apparatus may be constructed in a twenty-four slot stator by winding twelve full span windings. A full span winding has a 1 to 13 pitch on a twenty-four slot stator. Each coil is 15° electrical degrees apart. Thus, the phase angle of the current supplied by each phase of the inverter system is 15° apart. Such a configuration is preferable if push-pull inverters are used which were connected to both sides of each phase coil. Consequently, the phase angle between phase twelve and phase one is 165°. This is acceptable because electrical locations 180° to 345° are the back sides of the driven coils.

Half bridges also may be used with star connected windings. A balanced drive configuration may be achieved by driving the coil ends at slots 1, 2, 4, 7, 9, 10, 12, 15, 17, 18, 20, and 23 and star connecting the other coil ends. In this configuration the phase angles between phase 1 driving the coil end at slot one are: 0°, 15°, 45°, 90°, 120°, 135°, 165°, 210°, 240°, 255°, 285°, and 330°. Despite the uneven phase angles, the motor will be driven smoothly.

Thus, the phase angle of the alternating current used to supply each phase may be matched to the electrical angle of each phase winding within the motor. Symmetry, in terms of the vector sum of all phase angles, is utilized because of the star connection to the inverter drive system. However, phases need not be evenly spaced throughout the stator.

Moreover, the stator windings may be grouped into a plurality of three phase groups. These three phase groups may be driven by three phase control electronics, and may be shut off as a unit in the event of a localized failure. By shutting down individual three phase units, drive balance is maintained, and the apparatus is easier to repair. Further, the apparatus is easy to operate because it is set up as a plurality of three-phase unit groups.

Flux per pole is the total magnetic current flowing through each North or South pole. The magnetic flux is produced by the currents flowing in the stator windings and is determined by the following relationship:

$$\text{Flux/pole} = \frac{22,500,000 \times \text{coil voltage}}{\text{frequency} \times \text{turns/coil} \times Kd \times Ks}$$

(where flux per pole is given in lines of force [$10^{-8}$ Webers], coil voltage is in volts RMS, frequency is in Hertz, Kd is the winding distribution factor [which in the present invention is about 1], and Ks is the winding chord factor [which in the present invention is about 1]). For a two pole machine with a single coil per phase, phase voltage and coil voltage will be the same. For higher pole counts, windings of corresponding phase may be interconnected in either series or parallel configuration, as in three phase machines, thus phase voltage may be different from coil voltage.

A maximum flux per pole is selected based upon stator size, air gap size, and saturation considerations. Phase voltage is selected based upon inverter design considerations. As the present invention constructively uses harmonics, saturation of the stator iron into the non-linear region of the saturation curve may be used.

The present invention further includes an inverter system. For example, the inverter system may be a variable voltage, variable frequency inverter system. The present invention may use a number of inverters within the inverter system. The number of inverters is equal to the number of phases desired.

In the apparatus of the present invention, stator windings, and consequently electrical phase angles, are not necessarily evenly distributed. Further, push-pull inverter legs may be used to drive both sides of each phase. Additionally, high switching frequencies are not necessary. Alternatively, a single square wave pulse per half cycle, which is low speed switching, also may be used. Moreover, as many inverters are effectively operating in parallel, the apparatus of the present invention provides improved fault tolerance.

The inverters in the inverter system generate alternating current. Each inverter half-bridge generates a single phase of AC. All of the inverters generate AC of the same voltage and frequency; the difference between the phases is a time difference. A sine wave may be described by its amplitude, its frequency, and its offset (e.g., where it crosses zero or starts). The inverters are generating AC where the cycles start at different points in time. The time difference may be described in terms of the total duration of a single AC cycle, in a fashion similar to describing the number of PM pulses per AC cycle. A full AC cycle has a duration of 360 degrees, and the time difference between two different AC waveforms of the same frequency and amplitude is measured in degrees.

The present invention may be applied to a standard squirrel cage induction motor frame, e.g., an induction motor in which the secondary circuit consists of a squirrel-cage winding arranged in slots in the core. In this machine, the region of interaction between the stator and the rotor may be considered the surface of a cylinder. Rotation is about the axis of the cylinder, lines of magnetic flux pass radially through the cylinder surface, and current flowing in both the stator and the rotor conductors is parallel to the axis of the cylinder. The present invention may also be applied to pancake motors or other axial flux apparatus. The region of interaction, or air gap, is the surface of a disk. Rotation is about the axis of the disk, lines of magnetic flux pass axially through the disk surface, and current flows radially in both the stator and the rotor. Moreover, several rotors and stators may be stacked.

In the present invention, output torque capability of the apparatus increases as the square of the flux density. Therefore, it is advantageous to increase the design flux density. In a three phase apparatus, increased flux density would produce harmonic losses; however this is not the case with the present invention. In the present invention, harmonic rotating fields, generated by non-linear saturation effects rotate in synchronism with the fundamental rotating field. This allows the present invention to operate in the non-linear region of the saturation curve, where the saturation curve is the relation between the applied magnetic induction and the resultant magnetic field.

In the present invention, flux densities of at least 150,000 lines per square inch (2.33 Tesla) may be used. Further, the present invention may also be used at flux densities of about 110,000 to 130,000 lines per square inch or 1.71 to 2.02 Tesla, while being used in over voltage operation for short period overloads, i.e, operating at flux densities above these flux densities for short periods of time. The maximum torque capabilities may be increased by at least about 200% through the use of high flux densities. For example, given an induction apparatus frame and rotor with peak torque of 250% of nominal rated torque, the method of the present invention may be applied to the same frame and rotor, enabling a peak torque of 500% nominal rated torque, for short periods of time limited by motor heating.

With a twelve phase two pole apparatus of the present invention, a phase angle of fifteen degrees between adjacent phases is used. However, if a phase angle of forty-five degrees is employed, then the apparatus operates as a six pole apparatus. The maximum pole count, which may be used, is equal to the number of stator slots. In general, to change the pole count, the phase angle of the pulse modulated pulse modulated drive waveform signal is increased by odd integral multiples, which in turn increases the pole count of the magnetic field by the same amount of odd integral multiples. If half turn windings are used, then even integral changes in pole count may be made, however, if full turn windings are used, then an even pole count change places opposite winding halves at the same electrical angle. The use of high pole counts may be beneficial when the present invention is operated at high saturation levels.

Further, pole changing capability may be used to reduce stator saturation when operating at high saturation levels. It should be noted that any winding symmetries necessitated by the coil form or star point neutrality used should be maintained for alternative pole counts. In this respect, the full bridge drive is more flexible than the half bridge drive because the symmetry does not have to be changed.

The inverter system used in the present invention may be comprised of a number of individual inverters that are powered by multiple pulse modulated drive waveform signals. Alternatively, the inverters may be supplied by one pulse modulated drive waveform signal, as depicted in FIG.

4. The pulse modulated drive waveform signal is the command signal for the inverters.

Figure 4:
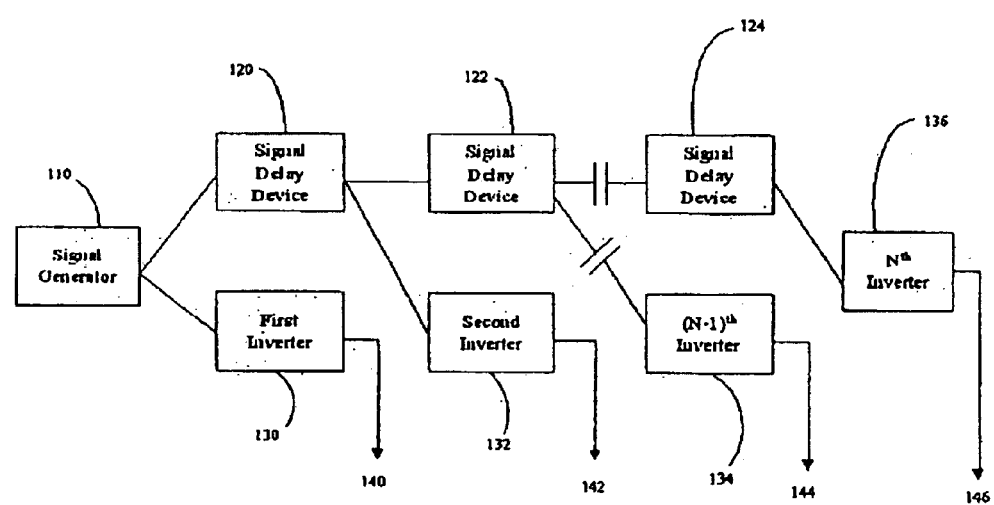
FIG. 4 illustrates a schematic of a delay device based controller for the inverter system of the present invention.

FIG. 4 illustrates a schematic of a delay device based controller for the inverter system of the present invention. The delay device based controller comprises inverters, a signal generator 110, and signal delay devices 120. Signal generator 110 produces a representation of the desired pulse modulated drive waveform signal. The pulse modulated drive waveform signal may be a PM square wave, however, analog representations or digital numeric representations, or other signal modulation schemes may be used. The representation of the desired pulse modulated drive waveform signal is coupled directly to an inverter 130 and to a signal delay device 120. The output 140 of inverter 130 is a single phase used to drive the rotating machine of the present invention. The output of signal delay device 120 is connected to a second inverter 132 and to a second signal delay device 122. The output 142 of inverter 132 is a single phase used to drive the rotating machine of the present invention, offset in time by signal delay device 120. The delay time of signal delay device 120 is selected to equal the desired phase angle delay at the drive waveform frequency. Further delay devices and inverters are added until the necessary inverter count is reached. For example, in a system with "n" inverters, a previously offset signal is sent to both signal delay device 124 and $(n-1)^{th}$ inverter 134, which outputs 144, and the output of signal delay device 124 is then fed into the $n^{th}$ inverter 136, which outputs 146.

The controller described herein, which uses signal delay devices, may be used with a rotating induction apparatus having greater than three phases. To use this controller with a twelve-phase system, two signal delay devices are used, each providing a delay of 30°. Further, the pulse modulated drive waveform signal may be analog or digital. Moreover, the signal delay device may be an analog or digital signal delay device.

The time delay of the signal delay devices matches the desired phase angle. For fixed delay signal delay devices, this results in a fixed frequency operation. However, signal delay devices may be clock based; for example shift registers and circular memories, as well as bucket brigade devices and switched capacitor signal delay lines. For these devices, the shift clock may be supplied by the same clock used for waveform synthesis, such as a main system clock. Alternatively, the signal delay devices may use a separate clock. Alternatively still, the clock signal used by the signal delay devices may be generated by the signal generator. When the clock is tied to both the signal generator and the signal delay devices, the drive frequency may be simply changed by altering the frequency of this clock. This clock need not be regular, and may be modulated between pulses to simplify output voltage control. Further, the clock does not need to have a fixed frequency. Additionally, speed changes made be implemented instantly by altering the clock used by the signal delay device.

While the number of signal delay devices depicted in FIG. 4 is one less than the number of phases, various symmetries may be exploited to simplify the delay logic, such as an inversion. A delay of 180° is simply an inversion. Thus, delays of greater then 180° may be considered an inversion plus a suitable delay less than 180°. For example, with an even number of phases, the number of signal delay devices may be reduced by a factor of two because the inversions of the delayed signals from 0° to 180° produce similar results for 180° to 360°. For the fundamental and all odd harmonics, an inversion is equal to a delay of 180°. For all even harmonics, an inversion is equal to a delay of 360°. Thus, inversions operate most effectively where odd harmonics predominate.

Another example of a beneficial symmetry when using a full bridge inverter, is by inverting each signal. This may be accomplished by having a signal fed directly into one half bridge, and an inversion of that signal be fed into the other half bridge. Thus, half the signal delay devices are used to drive all of the half bridges.

Additionally, various three phase control microprocessors may be used by the present invention, which synthesize three phases of PM output. These three outputs may be used to drive three (or six, if using full bridge) inverters in a three phase set, and the three phase signals may be fed through suitable delay devices to further three phase sets.

The signal delay device may be any device capable of delaying the inputted pulse modulated drive waveform signal. For example, the signal delay device may be any first-in-first-out (FIFO) buffer, such as a shift register, circular memory, bucket brigade, acoustic delay line, optical delay line, mercury delay line, surface acoustic wave (SAW) delay line, inductor capacitor (LC) delay line, a liner group delay all pass filter, a wave guide, or the like.

Alternatively, one signal delay device may be used, such that the signal delay device is able to handle multiple shifts, such as a multiple tap shift register. For example, when using 1024 bits per phase, an 18,432 bit shift register with 18 taps each 1024 bits apart may be used. Further, because numerous delays of the same length may be used, conventional parallel memory addressed in a circular fashion may also be useful.

Alternatively, the signal generator may generate a pulse modulated drive waveform signal that feeds a number of signal delay devices that are in parallel. This is accomplished by copying the pulse modulated drive waveform signal once for each inverter. All of the copies are then sent to a bank of signal delay devices. Each signal delay device may be set to create a delay that generates a different phase. For example, for nine phases, the first signal delay device may create the delay of 40°, the second signal delay device may create a delay of 80°, and so on up until all phases are created. The signal for 0° may come directly from the signal generator, as no delay is needed in that signal.

Using a signal delay device is advantageous because one signal may be used to operate any number of phases. The one signal is simply offset the appropriate amount of time for the number of phases in the apparatus, where time is measured as an angle relative to a full cycle. For example, if 15 phases were used, with half bridges, then the signal may go through 14 signal delay devices that offset each signal by 24° from the previous signal.

If the number of desired phases is changed, instead of having to create a large set of new signals, the delay from the signal delay devices could just be adjusted; by adding new phase drive electronics and adjusting the number of total bits per cycle of the AC the delay angle represented by a fixed delay length is changed to match the new number of phases. For example, with a digital signal and eighteen phases using half bridges the bit stream of the pulse modulated drive waveform signal is 36,864 bits (36×1024). Again, because half is used, 36,864/36=1024 bit represents a 10° phase difference. Additionally, inversion may be used; a delay line of half the length may be used to span one half of the delay needed, with the other half being supplied by inversions.

The apparatus of the present invention also may be of modular construction. This is another method of allowing the apparatus to easily adjust to a different apparatus having a different number of phases. The apparatus may be made modular by placing a half bridge or full bridge drive, whichever was being used, in a module. The number of modules needed for any particular apparatus is determined by the number of phases. For example, when changing from a system of 9 phases to 15 phases, 6 modules are added to the apparatus. Accordingly, by providing modular construction, one controller and multiple modules may be used on various motors with different phases. Moreover, the modularity allows easier maintenance of the apparatus.

Further, signal delay devices also may be included in the modules. Therefore, each module may include a half bridge and a signal delay device to carry the signal to the next half bride in the apparatus. The signal generator then may be connected to the same number of modules as are number of phases in the apparatus. The signal generator is programmed with the number of modules, the total delay, and any other information that the signal generator deemed necessary to create the pulse modulated drive waveform signal. Regardless, the signal generator still may use just two relevant outputs: (i) the bit stream comprising the pulse modulated drive waveform signal; and (ii) the delay line clock to control the length of the delays.

If using signal delay devices in the module, the controller may accommodate the difference in delays from the different phases in various apparatus by adjusting the length of the representation of the input pulse modulated drive waveform signal. For example, with a digital signal, the apparatus may be programmed to shift 1024 bits ($2^{10}$) for every phase. For a 9 phase apparatus, the length of the input pulse modulated drive waveform signal may be 9,216 bits (9×1024). If a 15 phase apparatus was used, the length of the input pulse modulated drive waveform signal simply may be increased to 15,360 bits (15×1024). Thus, regardless of the number of phases, 1024 bits are shifted, which is equivalent to one phase for each phase shift. Further, the hardware need not be adjusted as the pulse modulated drive waveform signal may be altered via software or by the signal generator that creates the input pulse modulated drive waveform signal. Alternatively, the input pulse modulated drive waveform signal may be based on any other amount of bits other than 1024, however, 1024 bits is preferred because it provides enough data for adequate voltage resolution and is easy for the signal delay devices to utilize. While the voltage resolution depends on the length of the pulse modulated drive waveform signal compared to the number of pulses per AC cycle, when the length is equal to twice the number of pulses per AC cycle, the voltage resolution is about 0.1%. Thus, 1024 bits provides a desired voltage resolution for all practical pulses per AC cycle.

Figure 5:
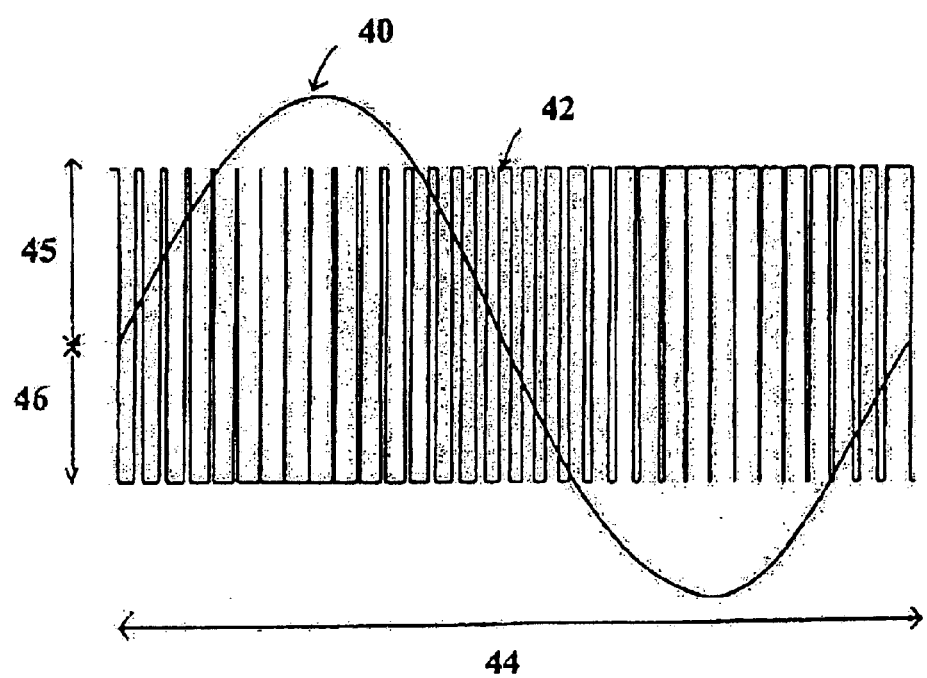
FIG. 5 illustrates a prior art approach to the formation of a drive waveform signal.

Additionally, the present invention may utilize a pulse width modulated drive waveform signal as the pulse modulated drive waveform signal. Referring now to FIG. 5, which shows a typical prior art pulse modulation approach, a desired drive waveform having a fundamental frequency 40 is approximated by a duty cycle modulated square wave 42 (the pulsing frequency). The desired drive waveform may be described in terms of amplitude, frequency, and phase. The duty cycle modulated square wave may be described in terms of switching or PWM period 44, positive amplitude 45 and negative amplitude 46. The synthesized PWM output voltage waveform produces current through motor windings, which closely approximates that which would have been produced by the desired output waveform. A microcontroller system used with three phase motors may be used, under software control, to develop the PM control signals for each of the three inverter phase outputs. Further, by adding additional output subroutines and using additional output lines, a three phase microcontroller may be used to control all of phase outputs in the present invention. The PWM waveform is modulated to obtain an approximation of a desired sine wave. The frequency of that desired sine wave is the fundamental frequency.

Force in a rotating induction apparatus is produced by the interaction of rotor currents and the stator magnetic field. For any particular motor design, saturation effects limit the magnetic flux per unit area of interaction between rotor and stator. Because the currents in the rotor are induced by this magnetic flux, saturation effects further limit the current per unit area. Force per unit area is proportional to the product of magnetic flux per unit area and transverse current per unit area; design changes which increase the allowable magnetic saturation will therefore increase the force per unit area.

Force per unit area may therefore be used to compare various rotating induction apparatus designs. However force per unit area is a value which is rarely recorded for such apparatus. Torque values, however, are universally recorded. Torque is the moment of force, that is, torque is the product of force time distance from the axis of rotation. Force per unit area, when multiplied by the total area, and when again multiplied by the distance of that area from the axis of rotation, will provide the total torque. It should be noted that if the radial distance of the air gap is not constant, as in axial flux machines, this calculation will need to be performed as an integral over the total area.

Thus, torque divided by the moment of interaction area may be used as an equivalent to force per unit area. For a radial flux rotating induction apparatus, such as squirrel cage motor or generator, the moment of interaction area is the area of the air gap cylinder multiplied by the radius of said cylinder. Dropping a constant of $2\pi$, this is the same as the equation for the volume of the rotor. Thus for a rotating induction apparatus, torque divided by rotor volume may be used as an equivalent to force per unit area.

Figure 6:
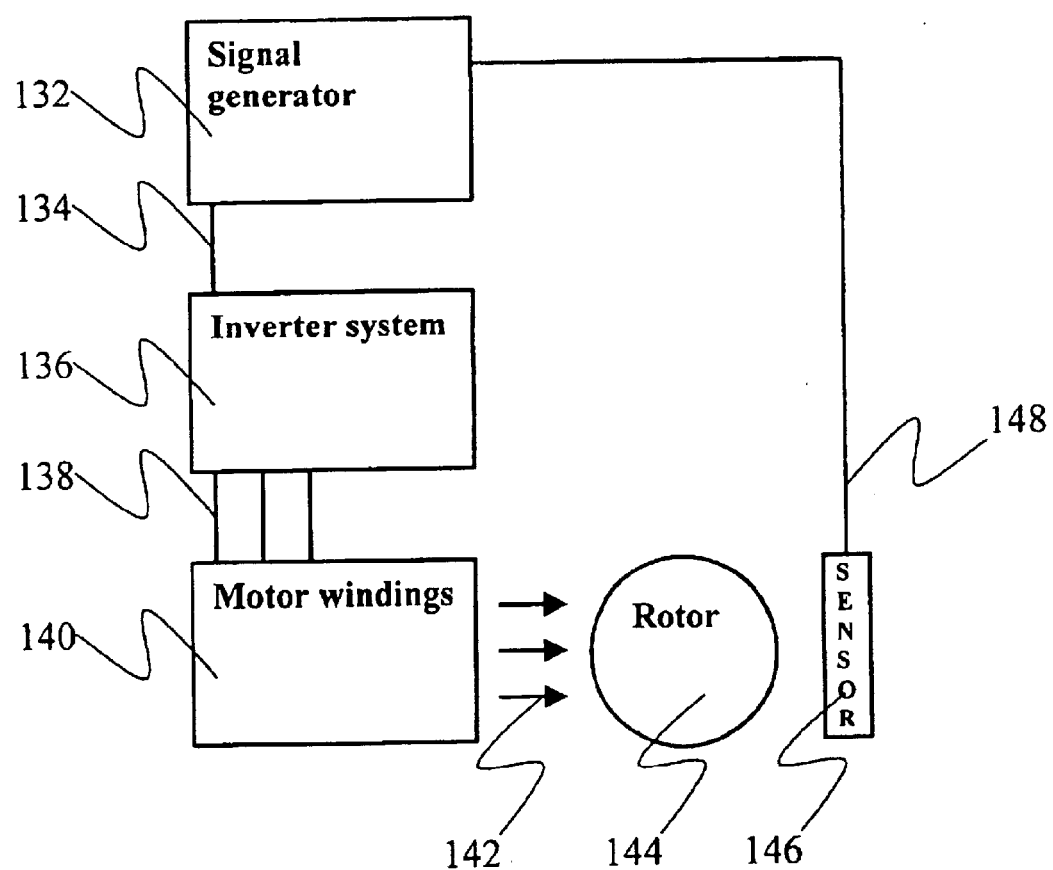
FIG. 6 illustrates a schematic of a rotating electrical apparatus of the present invention.

Referring now to FIG. 6, which shows in diagrammatic form an electrical rotating apparatus of the present invention, an inverter system 136 has a number of output phases 138 which are connected to a stator comprising windings 140. Three output phases are shown in FIG. 6, but a greater number of output phases may also be utilized as disclosed herein. A rotor 144 is electromagnetically coupled to a magnetic field 142 generated by the windings. A signal generator 132 generates a pulse modulated drive waveform to drive the inverter.

Pulse Frequency Synchronized with Rotor Frequency

FIG. 5 is a prior art representation of pulse modulation. The pulsing frequency (pulse modulation carrier frequency) is approximately 33 times the fundamental frequency. If the fundamental frequency is changed in response to the requirements of the motor, say increased by a factor of 1.7, then the pulsing frequency is now approximately 19 times the fundamental. Thus, in the prior art, the ratio of fundamental frequency and pulsing frequency is not fixed, and thus the magnetic field generated by the pulsing frequency will have a variable effect on the performance of the motor.

In one aspect of the present invention, the pulsing frequency is adjusted so that the rotating magnetic field generated by this the pulsing frequency is synchronous with the rotation of the rotor.

Referring again to FIG. 6, the drive waveform comprises a pulsing frequency, which causes the magnetic field to comprise a corresponding pulsing component. The pulsing frequency of the drive waveform is selected so that the rotating magnetic field generated by the pulsing component rotates in synchrony with the rotation of the rotor. This may be achieved in a number of ways, and one possible approach is depicted in FIG. 6: a sensor 146 provides feedback 148 to the signal generator.

In one embodiment of the present invention the pulsing distortion produced by the PM waveform is manipulated by suitable selection of phase displacement and frequency to produce a rotating field that is synchronous with the rotor, but not synchronous with the fundamental drive waveform. This means that the pulsing is not a harmonic of the fundamental drive waveform. Thus, the PM waveform is modulated to obtain an approximation of a desired sine wave. The desired sine wave is the fundamental drive waveform and sets the synchronous speed of the motor. A switching element is used to create a pulsing frequency and modulate the PM waveform. The switching of the switching element produces a large high frequency component. This large high frequency component produces a rotational magnetic field that induces current in the rotor. The induced current interacts with the rotational magnetic field to produce a torque. The present invention adjusts the pulsing frequency so that it is synchronous with the rotating frequency of the rotor. When the rotational magnetic field produced by the pulsing frequency is synchronous with the rotating frequency of the rotor, current is no longer induced in the rotor. Since current is no longer induced in the rotor, the pulsing frequency is eliminated as a source of torque, decreasing rotor losses, and increasing rotor efficiency.

The pulsing frequency is dependent upon the rotating frequency of the rotor, and the rotating frequency of the rotor is constantly changing. Therefore, if the rotating frequency of the rotor changes, the pulsing frequency is adjusted to synchronize the rotational magnetic field produced by the pulsing frequency with the rotating frequency of the rotor. The pulsing frequency is set by the inverter—therefore if the rotating frequency of the rotor changes, the inverter is caused, by some control action, to change its pulsing frequency.

Further, a pulse modulated drive waveform signal may have two superimposed rotating magnetic fields, one from the pulsing frequency and one from the modulation. It is the rotating magnetic field produced by the pulsing frequency that is synchronized with a rotating frequency of said rotor.

The pulsing frequency is less that the number of phases times the fundamental frequency (times two for star connected machines). For example, with an 18 phase machine with a fundamental frequency of 60 Hz, a pulsing frequency of 1080 Hz is used; in addition to the frequency relation, the appropriate phase relationship is also needed.

Synchronizing the rotational magnetic field produced by the pulsing current flow at the pulsing frequency with the rotating frequency of the rotor includes the selection of the proper pulsing frequency, and an appropriate phase relationship between the pulsing carrier of each phase. The phase relationship between the pulsing carrier of each phase is selected such that the rotating magnetic field produced by the pulsing frequency has a pole count less than, and approximately equal to, the number of slots in the stator. Once the appropriate phase relationship between the pulsing carrier of each phase is established, the proper pulsing frequency becomes the rotating frequency of the rotor times the number of poles in the rotating field produced by the pulsing carrier, divided by two. The pulsing frequency is dependent upon the rotating frequency of the rotor, and the rotating frequency of the rotor is constantly changing. Therefore, if the rotating frequency of the rotor changes, the pulsing frequency is adjusted to synchronize the rotational magnetic field produced by the pulsing frequency with the rotating frequency of the rotor.

In addition, whilst in a three phase system, PM torques are always adverse, in the present invention these torques may be either beneficially used or negated. For example, as stated above, when the magnetic field produced by the pulsing frequency is synchronized with the rotational frequency of the rotor, the rotor will not be effected by the magnetic field created by the pulsing frequency because no current flows into the rotor. Thus, the pulsing frequency is eliminated as a source of torque.

The present apparatus may also utilize a feedback system. The feedback system uses a controller frequency and a voltage which are both adjusted in response to the desired operation of the rotating apparatus and to the actual measured operation. For example, if the measured speed were below a programmed speed, the feedback control system may increase the frequency of the AC drive. The capability of such a feedback system is enhanced by the greater torque capability of the present invention.

Figure 7:
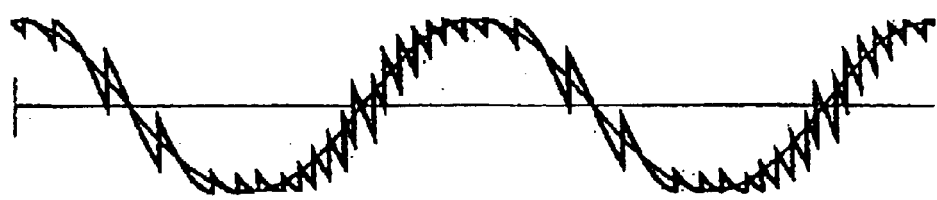
FIG. 7 illustrates a schematic of a pure alternating current with distortion that can be used to power the apparatus.

The apparatus of the present invention may also be powered by a source of alternating current other than an inverter. For example, the alternating current may be a pure alternating current with pulsing distortion; a high phase order cycloconverter (see FIG. 7), or a high phase order generator may also be used. The pure alternating current with distortion will have a both a fundamental frequency and a pulsing distortion frequency. The fundamental frequency produces a rotating field with a number of poles, depending on the wind of the machine, while the pulsing distortion frequency is greater than the fundamental frequency, and produces a rotating field with a greater number of poles than the number of poles produced by the rotating field of the fundamental frequency. The pulsing distortion frequency is chosen such that the pulsing distortion rotation field is synchronized with the rotational frequency of the rotor. The equation which governs this relationship is: Frequency of Pulsing Distortion Rotating Field=(2*Operating Frequency)/(Number of Poles). In general, this requires the number of poles and the frequency of the pulsing distortion to be substantially greater than those of the fundamental frequency.

Using alternating current would eliminate the need for inverters or an inverter system. The stator may be powered directly by the alternating current having greater than three phases. This system may then be used with any of the above modifications and maintains the advantages detailed above.

The alternating current used may have more than three phases. Preferably, the alternating current has twelve or more phases. Alternatively, the alternating current has eighteen or more phases.

Pulse Frequency is Integral Multiple of Fundamental Frequency

FIG. 5 is a prior art representation of pulse modulation. The pulsing frequency (pulse modulation carrier frequency) is approximately 33 times the fundamental frequency. If the fundamental frequency is changed in response to the requirements of the motor, say increased by a factor of 1.7, then the pulsing frequency is now approximately 19 times the fundamental. Thus, in the prior art, the ratio of fundamental frequency and pulsing frequency is not fixed, and thus the magnetic field generated by the pulsing frequency will have a variable effect on the performance of the motor.

In an aspect of the present invention, the pulsing frequency is adjusted so that it remains an nth-order harmonic of the fundamental frequency, i.e. the pulsing frequency of the drive waveform signal is in an integral multiple of the fundamental frequency and is therefore in a fixed phase relation to the fundamental frequency. This means that motor torques generated by pulse modulation are beneficial to the operation of the motor.

Figure 8:
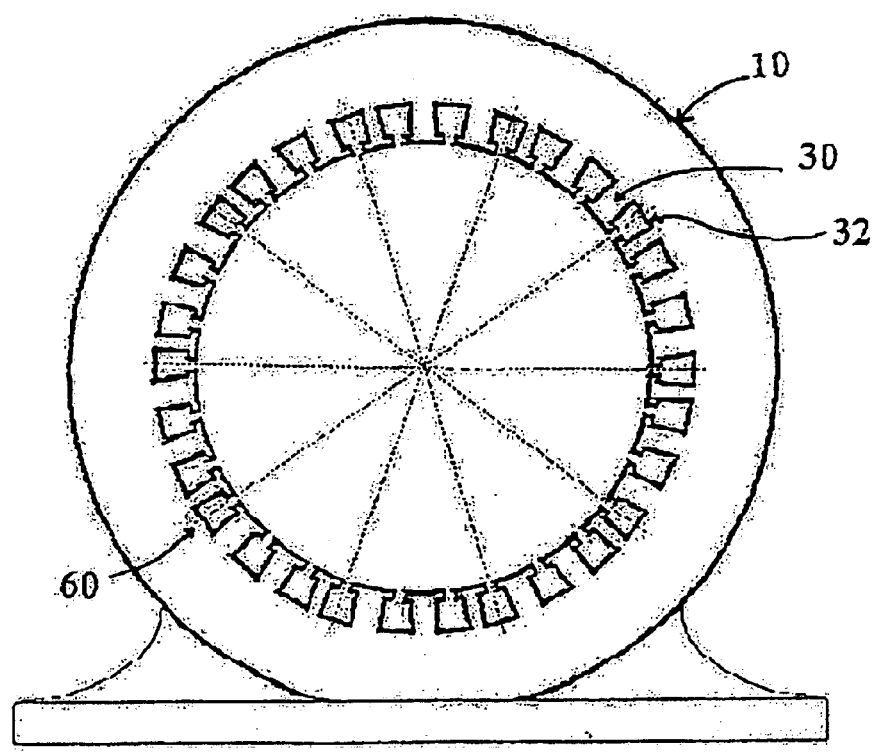
FIG. 8 illustrates a schematic of a motor stator with irregularly spaced windings.

There are various conditions that may alter the effect of pulse modulation on the apparatus. For example, there may be regular spaced windings or irregular spaced windings. Referring now to FIG. 8 the locations of the stator slots 32 need not be regularly spaced. In FIG. 8, the stator has 30 slots, for a 15 phase system. The 30 slots are arranged as 15 slot pairs 32 and 60, each slot pair carrying a single phase winding. The 15 slot pairs 32 and 60 are arranged as 3 sets of 5 slot pairs. Each set of 5 slot pairs is symmetrically arranged to provide for balanced drive. The 3 sets of 5 slot pairs are not evenly spaced. Other conditions that may affect the apparatus include: (i) the PWM may be in fixed phase relation to the fundamental frequency or not be in fixed phase relation to the fundamental frequency; (ii) the PWM may be regular or irregular; or (iii) the PWM may have a frequency above or below the phase count. An alternating current having harmonics in fixed phase relation to the fundamental frequency means that all of the harmonics in all of the phases of the alternating current have the same time relation to the fundamental frequency driving each phase. This means that the shape of the drive waveform is the same going into each phase.

While in a three-phase system, pulse modulation torques are always adverse, in the present invention these torques may be either beneficially used or negated. For example, when the pulse modulation waveform is in fixed phase relation to the fundamental and is an even multiple of the phase count, such as twice the phase count, with the windings being regularly spaced, the harmonic currents do not enter the apparatus. Thus, having the pulse modulation waveform in fixed phase relation to the fundamental and twice the phase count is advantageous, for one reason, because no additional noise is created by the harmonics.

When the pulsing frequency/fundamental frequency ratio is less than the number of phases in the apparatus, then the harmonics created from the pulsing cause additional currents to flow into the apparatus. When current flows into the apparatus under this condition in the present invention, the harmonic rotating fields created by pulsing currents are synchronized with the fundamental frequency. This results in additional torque being created. However, this additional torque is beneficial in that it is applied in the direction and speed that the motor is turning. Therefore, when the pulsing frequency is in an integral multiple of the fundamental frequency, and is less than the number of phases× fundamental frequency in the apparatus, the efficiency of the apparatus is improved and the current noise is significantly reduced.

However, when the pulse modulation waveform is not in fixed phase relation to the fundamental, this produces a non-beneficial rotating field.

As stated above, harmonics that are in fixed phase relation to the fundamental produce beneficial harmonic rotating fields. A square wave comprises a fundamental sine wave, of the same frequency as the square wave, and various quantities of odd harmonics—with the proportions of the odd harmonics varying depending on the duty cycle of the square wave. A square wave, however, in comparison to a sine wave, is easy to implement and may be used inexpensively. Because the apparatus of the present invention utilizes harmonics, simple, efficient square wave inverters may be used with the present invention. In conventional three phase apparatus, to avoid losses due to harmonics, higher switching speeds are used. Conversely, because the transistors that generate square waves may be switched slowly, they produce less electrical noise than with high speed switching. Therefore, the apparatus will be audibly quiet in operation.

In a yet further embodiment of the present invention, the pulsing distortion produced by the PM waveform is manipulated by a suitable selection of phase displacement and frequency so that the drive waveform signal drives the inverter system and the pulsing frequency of the drive waveform signal is in an integral multiple of the fundamental frequency and the drive waveform signal is fed to the inverter system through at least one signal delay device.

Pulse Modulation

A further embodiment of the present invention is directed to a PWM control system, which synthesizes an output waveform in which the PWM carrier has a frequency, which is a multiple of the desired output frequency. The carrier frequency is regulated to be a multiple of the synthesized output waveform frequency. When the output frequency is changed, the carrier frequency is similarly changed. When the PWM carrier frequency is a multiple of the synthesized frequency, much noise is eliminated, resulting in a more efficient device. Furthermore, there is less harmonic content in the phases other than the fundamental, resulting in improved efficiency and output fidelity.

There are numerous techniques used to produce PWM modulation, including analog techniques in which an analog sine wave is compared to an analog triangle wave, with the result of the comparison used to drive the output half bridges. An implementation of the present invention would be to use the triangle wave as a time base driving a digital divider and a phase lock loop, which produces the sine wave. Output frequency may be adjusted by changing the frequency of the PWM triangle wave, or by adjusting the divider value.

A preferred implementation is purely digital, and is similar to that commonly used in conventional PWM synthesis systems. In such systems, a high frequency clock is used to identify regularly spaced intervals. For each interval the time of the PWM transition is calculated through a calculation of the desired output amplitude. The difference between the present implementation and prior art is that the calculation of the sine value (or other periodic output waveform) is adjusted so as to repeat exactly after a fixed number of intervals. This may be done, for example, by storing the amplitude values in a look-up table, and by incrementing the pointer to the look-up table by 1 each PWM interval. This fixes the look-up table repetition frequency to be in fixed relation to the PWM interval.

Other implementations of a fixed number of pulses per PWM cycle may similarly be used.

In one embodiment, the number of pulses per output waveform cycle is set to be an integer, so that the pulsing becomes a harmonic of the fundamental. This is done at the logic level of the inverter. In high phase order (HPO) motors and generators, utilizing more than three different phases (as opposed to multiple repeated phases, such as in a multi-pole motor), this invention has many benefits. In machines with a high number of phases, harmonics that are present in the waveform are harnessed and synchronized with the waveform to actually produce a torque in the direction of rotation, instead of being a dragging force as they present in three phase machines, and needing to be filtered out. For this reason, machines with a high number of phases may use concentrated windings, instead of distributed windings.

In a further embodiment, this number of pulses per output waveform cycle should be a multiple of the number of phases. For example, in a seventeen phase machine the frequency of the PWM carrier wave would be set to produce exactly 34 pulses per cycle.

In a further embodiment, the number of pulses per output waveform would remain constant even if the waveform frequency changes, by the pulsing waveform being connected to the waveform frequency so that changes to one affect the other.

In a further embodiment, the frequency of the PWM would be adjustable and able to be changed between values, such as between various multiples of the number of phases. Therefore, in the 17 phase embodiment, at a relatively high speed of operation, such as about 60 Hz, one may choose to use 34 pulses per cycle, and at slower speeds, such as 40 Hz, one may choose to use 51 pulses per cycle, which is also a multiple of 17. At slower speed still, such as 30 Hz, one may prefer 68 pulses per cycle, which is also a multiple of 17. A reason for increasing the number of pulses per cycle in this way as speed decreases is because whilst it is desirable for the PWM to remain a multiple of the desired output frequency, it is also desirable to maintain the PWM frequency within a desired range. In this way, the PWM frequency will be adjusted between about 1:5 and 3 KHz.

The frequency of the PWM is regulated to always contain an integral number of pulses per cycle of alternating current output waveform current (except perhaps momentarily during brief moments in which the output frequency is adjusted). However, being that the present invention utilizes pulse modulation control, at the logic level, the PWM frequency may be adjusted to contain a different integral number of pulses per cycle. In a seventeen phase system, one may wish to use, for example 15 pulses per cycle. This carrier wave frequency would create a synchronized harmonic with the fundamental output waveform it is synthesizing. The number of pulses per cycle is arbitrary and may be changed according to operating conditions. Further considerations would include machine inductance and switching losses.

In an inverter system containing IGBTs, the turning "on" and "off" of each phase is independent. Such a system would benefit greatly from the present invention.

In the present invention, the pulsing frequency is set by computer and its clock system and is not inherent in the power electronics. Therefore, it is fully adjustable. The pulsing frequency is adjustable but linked to the output waveform frequency, at the logic control level. The pulsing frequency is set to be a multiple of the output frequency, but, should be adjustable to set which multiple of the output frequency it is. This adjustability could be by a user or according to preset conditions, such as speed.

A further embodiment of the present invention relates to the use of look-up tables. Although some systems use calculation to determine the sine of each angle, look-up tables with a limited number of entries are often used. The use of look-up tables is of particular value when non-sinusoidal output waveforms are desired. Commonly, the number of entries in a look-up table is a power of two, owing to the nature of binary arithmetic and look-up table addressing. In general, computer memory is supplied in packaged components which store 2 to the power of n, values. As described above, the use of a look-up table introduces error in the calculated sine value, which is reduced when the number of entries is increased. However a general increase in the number of entries will never by itself reduce the error to zero.

In a polyphase system, several inverter outputs are synthesized with different phase values, but the same frequency and amplitude. In general, for each phase, the error introduced by look-up table angular mismatch is different for each phase. This error introduces a phase imbalance, and reduces drive efficiency. This phase imbalance may be reduced by increasing the number of entries in the sine table.

The method of the present invention reduces the phase imbalance without substantially changing the number of entries in the sine table.

By selecting a sine table in which the number of entries is an exact multiple of the number of PWM pulses per cycle and also an exact multiple of the number of phases in the machine, there will error commonly introduced to the system by look-up table inaccuracies will be eliminated. This eliminates a source of phase imbalance.

For example, in a 36 slot system, the phase angle between phases must be some multiple of $\frac{1}{36}$ of a full cycle. As long as the number of entries in the sine table is a multiple of 36, then the phase errors will be balanced. In this case, sine tables of 216, 252, or 288 entries would result in similar angular error to a 256 entry sine table, but this error would be evenly distributed across all of the phases, and the drive would be balanced and more efficient.

In general, the number of slots is related to the number of phases, and most motors are symmetrical. Therefore, using apparatus including the design feature of look-up tables having the number of entries according to the number of phases and the number of pulses per cycle (which, in one embodiment mentioned above, is anyway a multiple of the number of phases), results in less phase imbalance, and greater efficiency, greater output fidelity, and less noise.

Some motors are however asymmetrical. Sometimes the slots are not evenly distributed around the stator, and sometimes the motor phases are not evenly distributed amongst the slots. It is then necessary to compute a number of sine table entries which will allow each phase to correspond to an entry. Each slot needs to 'hit' a lookup table entry the same as the others. For the irregularly spaced windings, a symmetrical slot distribution needs to be found (presumably with a larger number of slots than the real machine) in which each real winding lines up with one of the symmetrical slot positions. Some of the symmetrical slot positions are not used. Use the symmetrical number as the 'number of slots' (presumably divide by the pole count to get a phase count). For example, in a machine with slots at 0, 4, 12, 16, 24, 32, 36, 44, 48 (eg. skipping every (3n−1)*4 in a set of multiples of 4) to get a 60 slot machine with irregular spacing, would be treated as a 90 slot machine for the purpose of figuring out the number of table entries.

In combination, the embodiments including controlling the PWM frequency to synchronize with the waveform frequency, and to include an appropriate number of PWM look-up table entries as described above, greatly increase PWM fidelity, and subsequently, motor performance.

Thus, it is apparent that there has been provided, in accordance with the present invention, a method and apparatus for a PWM improvement that satisfies the advantages set forth above.

Some specifications, which are not substantial to the invention, may have been made in order to better describe the best mode foreseen of the invention. For example, motoring machinery of different phase orders have been described. They may have three, four, five phases or seven phases, or even substantially more. In another example, sine look-up tables have been mentioned, but the invention could also be applied to cosine look-up tables, or inverse sine look-up tables, or any arbitrary waveform, etc. The specification has spoken of PWM in cases where other pulse modulation schemes may be equally viable, and can benefit extensively from the present invention. Also, PWM is used in the present specification to provide drive waveform to a motor. While this is the best mode as envisaged, there may be other uses of PWM output which can benefit equally from the present invention, so the use of a motor should not be seen as the only embodiment of the present invention.

Using Harmonics in Addition to the Fundamental Frequency

In another embodiment of the present invention, selected harmonic components are introduced into the system to allow an increase in the amplitude of the fundamental drive waveform for the same peak amplitude. Harmonic components include both frequency and phase.

Harmonics may be added to the drive waveform in order to increase the fundamental drive waveform amplitude for the same peak amplitude, and this can be either the voltage waveform for a voltage mode inverter, or the current waveform of a current mode inverter. Harmonics could also be selected which control the flux pattern generated in the motor itself. Moreover, it could also be selected based on which peak was desired to be reduced.

In this embodiment of the present invention, odd harmonics are added in addition to the fundamental frequency. For example, the 3rd, 5th, etc., up to the number of phases may be added to the fundamental. For example, it may be desired just to add one additional harmonic, for example the 3rd harmonic or the 5th harmonic.

For example, if third harmonic energy is added to the to the fundamental, the third harmonic energy will be used less efficiently than the fundamental energy. However the third harmonic can reduce the voltage at the peak of the fundamental waveform, and similarly reduce the peak flux in the motor. By adding the third harmonic, the amount of fundamental energy being fed into the machine is increased, obtaining higher total flux levels for the same peak flux levels. The net result is that machine operation is significantly more efficient.

Traditionally, the maximum AC output voltage of an inverter is limited by the DC link voltage used; the maximum of the synthesized AC correspond to the DC link voltages. If the desired output sinusoid is combined with its third harmonic, a waveform that has its peak at about 95% of the peak of the pure output sinusoid is produced. The desired component still has the same amplitude, but one gets it with a waveform that has a lower peak. If this waveform is now synthesized at the maximum that the inverter is capable of, then the fundamental component is found to be about 6% larger than what the inverter is directly capable of producing. A three phase motor does not pass third harmonic, so while there will be third harmonic voltages present on the terminals, no third harmonic current will flow, and only the fundamental is "seen" by the motor. The net result is that by adding the right amount of third harmonic, the realizable fundamental component can be increased considerably.

In the present invention, a motor may pass the third harmonic. The peak limiting aspect of adding certain odd harmonics to the fundamental will still apply. By adding the third harmonic, the inverter will be capable of producing a higher fundamental voltage. The peak limiting aspects, rather than being limited to the inverter voltage capability, now extended into the motor. The peak of the magnetic flux will be reduced by the harmonic components in the drive waveform, allowing higher total flux to thread the machine. The increased flux will increase motor output capability as well as increasing efficiency at normal operating loads. If total flux is limited by backiron flux density, then the same total flux can be allowed to thread the machine with reduced peak airgap flux density.

In the present invention, a high phase order motor is used which is capable of using harmonics. The present invention obtains its benefits by adding selected harmonic components to the fundamental drive waveform. This works because of the non-linear response of the magnetic materials to flux density. As the efficiency of the motor increases with increased flux density, a method for increasing total flux while preventing the increase in peak flux density is desired. This involves changing the flux distribution to something other than sinusoidal. With a sinusoidal flux distribution, the relationship between peak flux density and total flux is fixed. Owing to the nature of periodic function, any magnetic flux distribution may be considered to be the sum of a number of different sinusoidal flux distributions, of suitable frequency and phase. Therefore, the simplest examples of suitable non sinusoidal flux distributions are compounded from sinusoidal flux distributions, however, more complex drive waveform and flux distribution functions may be used.

Further, depending on the drive waveform, different phase relations are used. For example, if the drive waveform is the voltage applied to the apparatus, then one set of relationships is used, while if using, for example, a current mode inverter, then a different phase relationship is used.

Figure 9:
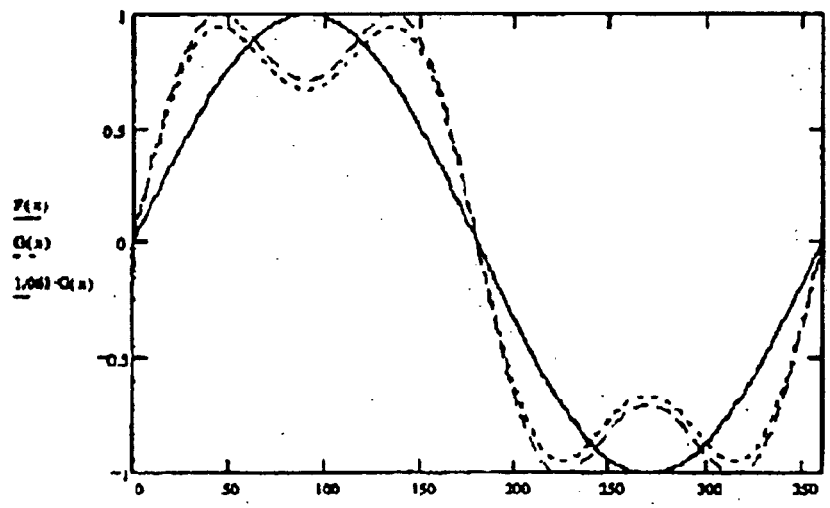
FIG. 9 illustrates a graph of a sinusoidal and a simple non-sinusoidal flux distribution.
Figure 10:
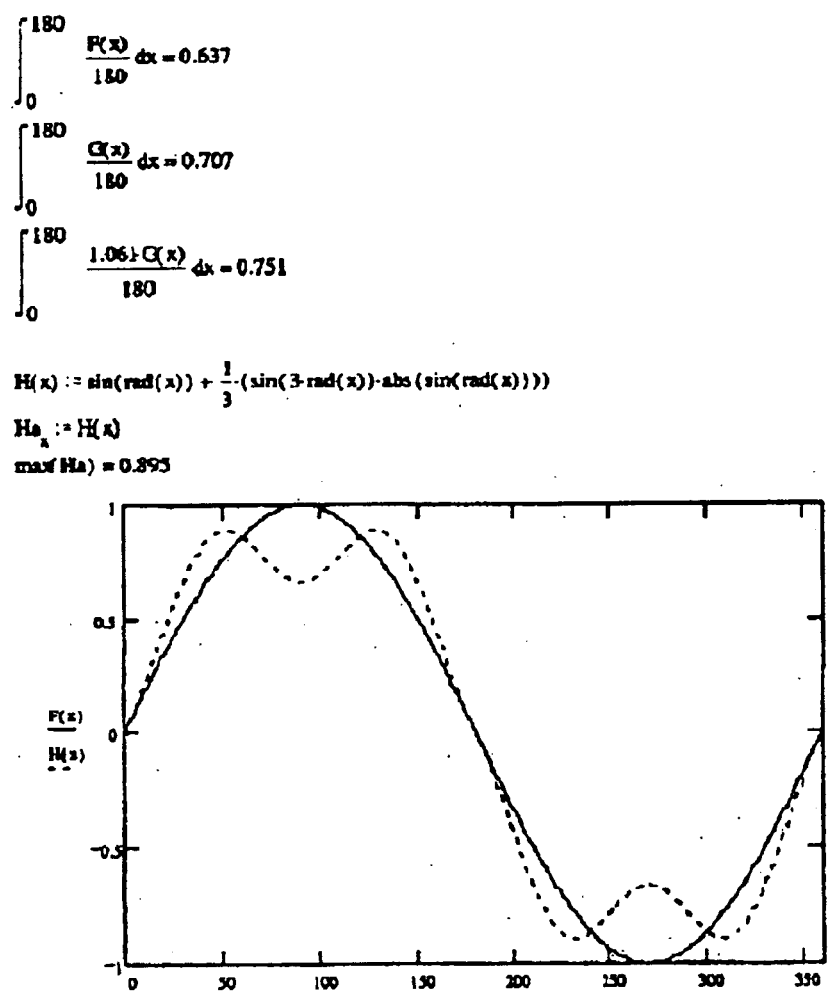
FIG. 10 illustrates a graph of a sinusoidal and a higher order non-sinusoidal flux distribution.
Figure 11:
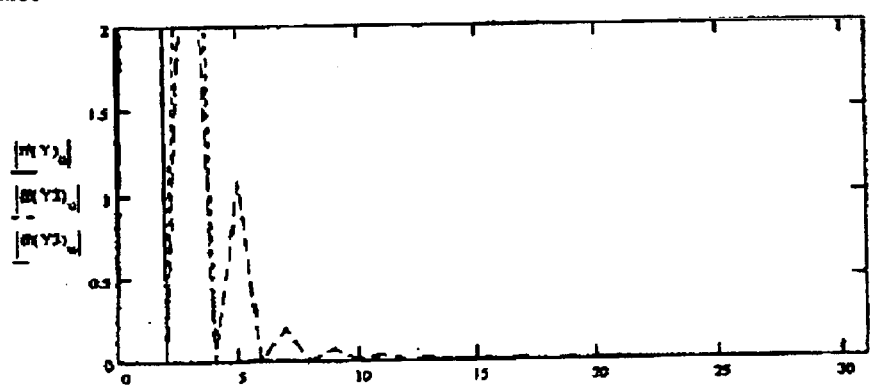
FIG. 11 illustrates a graph of the spectral content of the waveforms of FIG. 10 and 11.

With reference to FIG. 9, the solid line represents a standard sinusoidal flux distribution, given by the equation $A*\sin(x)$, with peaks normalized to $>\forall 1$, and with an average flux density on the same normalized scale of 0.637. The dashed line represents a flux distribution composed of a fundamental sine wave and a selected quantity of its third harmonic, given by the equation $A*\sin(x)+A/3*\sin(3x)$. The intensity of the fundamental component is the same as that of the pure sinusoidal flux distribution, but there is now additional flux in the form of the third harmonic. The average flux density on the normalized scale is now 0.707, and the peak flux has been reduced to 0.943. With a lower peak flux, a greater average and total flux density are achieved. When the peak flux is restored to 1, by increasing the magnitude of the flux components, this average may be increased still further. A flux distribution represented by $1.061*(A*\sin(x)+A/3*\sin(3x))$ has a peak flux density of 1 and an average flux density of 0.751, considerably greater than that of the pure sinusoidal flux distribution.

Other waveforms may also be used. With a square wave flux distribution, the peak flux density and the average flux density are the same.

The formula that relates AC drive frequency to sinusoidal magnetic field rotational velocity is 120 f/p. This means that the greater the drive frequency, the greater the magnetic field rotational velocity, and the greater the number of poles in the magnetic field, the slower the magnetic field rotational velocity. This formula applies to pure sinusoidal flux distributions, and additionally applies the sinusoidal components of compound flux distributions. In the previous example, the third harmonic component of the compound magnetic field would need to be driven with an AC frequency of three times that of the fundamental.

A conventional three-phase winding is designed to produce or approximate a pure sinusoidal flux distribution. Additionally, were a conventional three phase winding modified to produce a magnetic field which included suitable harmonics, then these harmonics would be energized by the same AC which feeds the fundamental, and the harmonic rotating fields would not rotate in synchronism with the fundamental. Despite these limitations, conventional three phase winding techniques may be extended to produce suitable non-sinusoidal flux distributions.

In the art of three phase machines are windings which produce sinusoidal flux distributions of different pole counts. Additionally, techniques exist in which two or more three phase windings, each with a different pole count, are placed in the same stator. The usual reason for the use of multiple windings is to provide for multiple speed motor operation with fixed frequency AC supply. In the method of the present invention, a new use of multiple three phase windings is provided.

In a fixed frequency three phase multiple winding machines, one winding is used while the other windings are not connected. To operate at a different speed, a different winding is connected to the AC supply. In the method of the present invention, all of the windings are energized at the same time, using variable frequency AC supply, such that each winding produces a rotating field which rotates at the same speed.

In one aspect of the present invention, a novel use of multiple three phase winding techniques may be used. A machine may be wound with two windings, and both windings energized with suitable frequency and phase to provide a desirable non-sinusoidal flux distribution. To return to the example of fundamental plus third harmonic, a machine is wound with two windings. The primary winding is a three phase windings which produces a two pole rotating field with sinusoidal flux distribution. A second winding is placed in the same slots as the primary winding. This is a three phase winding which produces a six pole rotating field, again with a sinusoidal flux distribution. Both windings are energized at the same time. The primary winding is energized with AC to provide the desired rotational speed. The secondary winding is energized with AC at three times the frequency of that of the primary winding. Phase relation between the two sources of AC is selected such that the two pole winding flux peaks correspond to negative flux peaks of the six pole winding. Under varying load conditions, the relative drive magnitude or relative drive phase relation may need to be changed in order to maintain optimal peak flux reduction.

In a multiple winding three phase machines, the size of wire used for the various windings is often the same. In the method of the present invention, consideration is given to the fact that the higher pole count windings will be carrying considerably less power than the primary winding, and thus the secondary windings will in general be smaller than the primary winding, in proportion to the portion of the magnetic flux they produce and power current that they carry. Using three phase winding techniques, for each harmonic structure added, an additional three phase winding is added as well to the stator winding set.

High Phase Order Concentrated Winding Machines

In the present invention, specific beneficial drive waveforms are presented. A non-sinusoidal drive waveform will produce non-sinusoidal current flows in the stator windings, which will produce non-sinusoidal magnetic rotating fields. Harmonic content in the drive waveforms will produce harmonic content in the rotating field, but these harmonic rotating fields will rotate in synchronism with the fundamental rotating field.

Relation between the multiple three phase winding machine described above and the currents in the high phase order concentrated winding machine is as follows. In the multiple three phase winding machine, at any given instant, there will be a particular total current flowing in each slot. This total current is composed of all of the different currents in all of the different windings in that slot. This may include current from different three phase winding sets, as well as current from different phases of the same three phase winding set. In the high phase order concentrated winding machine, this same total slot current is caused to flow in a single winding in the same slot. By providing individual control of the current in each slot, the results obtained from multiple three phase windings may be achieved with a single high phase count winding. High phase order windings offer a large number of other advantages, detailed in the above referenced disclosures.

In the example disclosed on FIG. 9, the average flux density was increased without increasing peak flux density. This may be done by adding suitable harmonic components to the rotating field, either with supplementary three phase windings of different pole count, or by adding suitable harmonic content to the drive waveform of a higher phase order concentrated winding motor. There is a sum relationship between airgap flux and backiron flux. Thus, any increase in total airgap flux will result in an increase in backiron flux density. This is true even if the increase in total airgap flux occurs with no increase in peak airgap flux density. This can approached in two fashions. Additional backiron may be used to carry the additional total flux, or the method of the present invention may be used to decrease peak airgap flux for the same total flux and thus the same backiron densities, thereby increasing machine efficiency.

With a square wave flux distribution, the average flux density is equal to the peak flux density. Thus if the peak flux density is reduced to 0.637 of the previous value, then total flux will remain the same, and the backiron density will remain the same. The difficulty with this approach is that considerable energy is placed in high order harmonics, and the fundamental intensity is reduced considerably.

Figure 12:
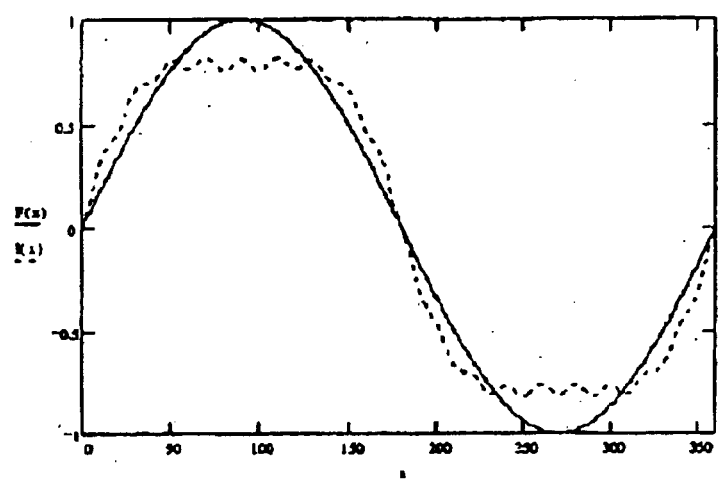
FIG. 12 illustrates a waveform with the 1st through the 17th harmonic.

With suitable selection of airgap flux distribution, peak airgap flux density may be reduced, while maintaining constant total flux, and also maintaining constant fundamental flux amplitude. A flux distribution described by $A^*\sin(x)+\frac{1}{3}^*(A^*\sin(3x)^*\sin(x))$ is the simplest such waveform. With such a flux distribution, the fundamental flux intensity remains constant, and the total flux remains constant. Peak flux density remains constant in the back iron, but peak airgap flux density is reduced to 0.895 of the pure sinusoidal value. This will increase machine efficiency without reducing machine performance. Other similar approaches are possible, for example the waveform described in FIG. 12, which has the same fundamental amplitude, as well as the same total flux and average flux, but which has a peak flux of only 0.822 of the pure sinusoidal value. These latter more complex waveforms have harmonic components that extend over a large range, and could not be reasonably produced using multiple three phase windings. However these complex harmonic flux waveforms may be produced using the high phase order concentrated winding motors.

The impedance of the windings in a motor are quite complex, and depend upon such factors as saturation and current flowing in the other windings of the motor. Thus to provide suitable current flows in order to produce the desired composite flux waveform, applied terminal voltage will need to be adjusted. For example, in the simple case of fundamental plus third harmonic, to a first approximation, the applied voltage is also fundamental plus ⅓ third harmonic. However leakage flux for the third harmonic rotating field is greater than that of the fundamental, leading to excessive third harmonic current flow. Therefore, the magnitude of the third harmonic voltage to be used is best determined by experiment or simulation. In general, the voltage required to provide a particular harmonic current flow will be less in proportion to the fundamental drive voltage, than the harmonic current to the fundamental current.

The present invention may also add any single, or any number of odd harmonics. For example, the for a 18 phase motor, the 3rd, 5th, 7th, 9th, 11th, 13th, 15th, 17th harmonics may be added. For a 36 phase motor, the odd harmonics up to the 35th harmonic may be added. Thus, for a given high phase order motor, for example of the type described above, the harmonics up to the number of phases in the motor may be added to obtain he benefits described herein. In general, the motor will use windings in which a single phase extends across two slots in two poles, and will be limited to the use of odd order harmonics. By adding suitable harmonic content, the motor flux distribution or the drive or motor current distribution may be altered in a desired and beneficial fashion. By adding suitable odd order harmonics, peak airgap flux may be reduced for the same fundamental flux, and the same total flux, or the total flux may be increased for the same peak airgap flux.

Additionally, the original drive waveform signal may have a fundamental frequency and harmonics. The pulsing frequency is tied to the fundamental frequency in order to make it a harmonic, or it is tied to the rotor frequency in order to make it vanish. The signal generator can generate a secondary drive waveform signal which is added to the drive waveform signal, which is not a harmonic of the drive waveform signal, and which will produce a rotating field which rotates at a different rate than the fundamental; this is an on purpose non synchronous rotating field which is very low intensity and used to detect rotational velocity.

Mesh Connection

In addition to the star connection and full bridge connection, a mesh connection may also be used to connect the motor windings to the inverter set. A mesh connection gives high voltage across the windings, with the same number of transistors as a half bridge system. A mesh connection has the benefit that the number of inverter half bridges used is ½ the number of winding terminations, as in the star connection, and that each winding end is directly connected to an inverter half bridge, as in the full bridge connection. With the full bridge connection, the voltage placed across a winding is twice that of the star connection. With the mesh connection, the voltage placed across the winding is slightly less than twice that of the star connection.

In common three phase machines, the mesh connection is known as 'delta.' A description of a high phase order mesh connection is as follows. A high phase order winding has an even number of winding ends. This may be an even number which is twice an odd number, that is an even number of the form 4n+2 where "n" is an integer, or the winding may be divided into a number of such sets.

Such a set of 4n+2 winding terminations may be, considering a single set of 4n+2 winding terminations, symmetrically disposed about the stator; each inverter output is connected directly a winding end, as in the star connection. In the star connection, each driven winding end is separated by a winding end which is connected to the star point. In the case of the mesh connection, each inverter output is additionally connected to the adjacent winding end that would otherwise be connected to the star point.

Figure 13:
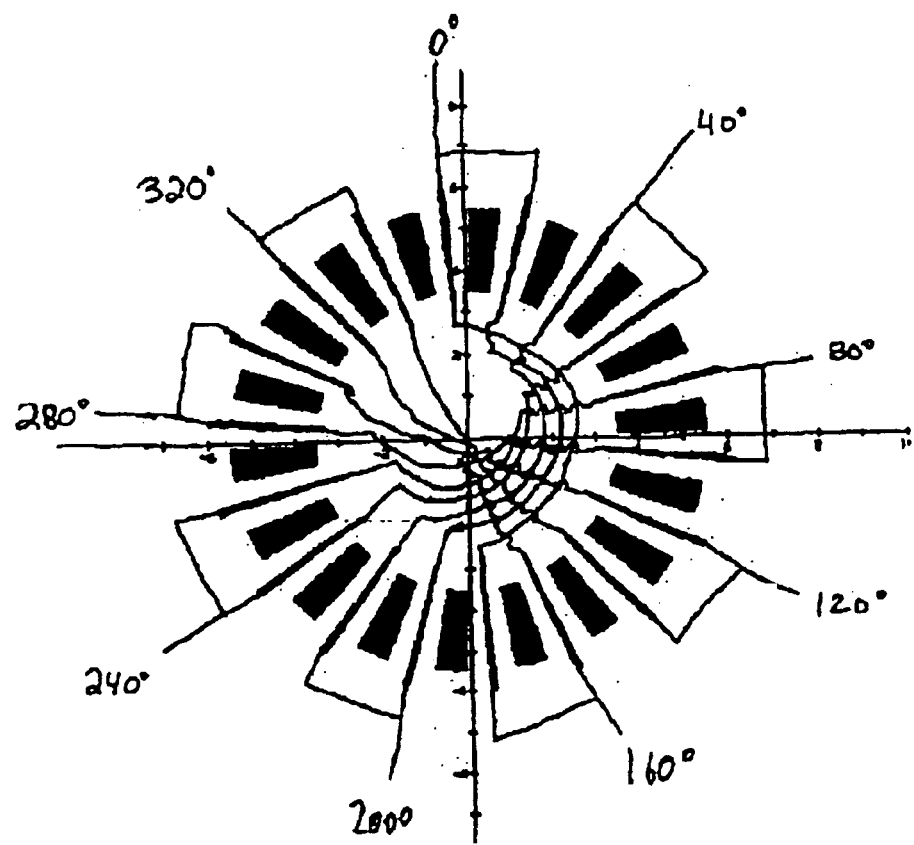
FIG. 13 illustrates a 9 phase mesh connection in an 18 slot stator.

With reference to FIG. 13, a mesh connection for a nine phase winding in an 18 slot stator is shown. The 0° inverter output is connected both to the winding end at 0° and to the winding end at 20°. The 40° inverter output is connected to the winding end at 40° and to the winding end at 60°, and so on throughout the entire stator.

The opposite end of the winding in the 20° slot is found in the 200° slot. Thus this winding is driven at one end by the 0° inverter, and on the other end by the 200° inverter. These two windings are physically 20° apart, and the phase difference of the voltage difference placed across these windings is similarly 20°, so that the windings are driven correctly.

Connections other than the adjacent otherwise star pointed winding end may be used, for example winding ends 120° apart may be selected, providing multiple three phase delta connections. The use of the multiple three phase delta connection is of particular benefit when drive waveforms of high harmonic content are used, for example with conventional six step inverters. With other mesh connections, the amplitude of other harmonic components is greatly altered, although such harmonics as do flow will still rotate in synchronism with the fundamental.

The present invention uses torques created by harmonics to more efficiently operate the apparatus. Based on operating at a flux density of 150,000 lines per square inch (2.33 Tesla) the present invention provides an increase of at least 33% in peak torque versus rotor volume for otherwise similar rotating induction apparatus operating at the current conventional maximum of 130,000 lines per square inch (2.02 Tesla). When operating at 200,000 lines per square inch (3.11 Tesla), the present invention provides an increase of at least 137% in peak torque versus rotor volume for otherwise similar rotating induction apparatus operating at the current conventional maximum of 130,000 lines per square inch (2.02 Tesla).

The present invention is also applicable as an electrical generator. To use the present invention as an electrical generator, mechanical power is supplied to the rotor and the source of power to the inverters is modified to consume the power the apparatus is now generating. Any technology used for inverter controlled three phase machines, which provide regenerative breaking capabilities, may also be applied to the present invention.

The present invention is applicable to all geometries of the AC induction apparatus. The present invention is further applicable to both squirrel cage and wound rotor apparatus, which includes buried conductors and three phase and high phase order wound rotors. Moreover, pulse modulation may be pulse width modulation ("PWM") or pulse amplitude modulation ("PAM").

Additionally, the present invention is also applicable to all different inverter topologies that have been used in the operation of three phase apparatus. These include voltage mode pulse width modulation inverters, which provide an alternating current regulated to a specified RMS voltage, and current mode pulse width modulation inverters, which provide an alternating current regulated to a specified RMS current. Further, linear inverters which provide true continuous output, both current mode and voltage mode, may be used. DC link inverters, resonant link inverters, and cycloconverters, all of which are different modes of supplying power to the inverter phase outputs, also may be used. Power factor correction hardware may be used on the power inputs of the inverter drive system, and regeneration capability also may be a functional part of the inverter drive system. Square wave inverters with high harmonic content in the output wave form also may be used. Moreover, push-pull inverters also may be used, doubling the effective voltage capability of the inverter drive system, at the expense of using more active devices.

Further, the present invention is applicable to geometries in which the region of interaction between stator and rotor has circular symmetry about the axis of rotation, magnetic flux is generally normal to the region of interaction, and current flow is generally perpendicular both to flux and the direction of motion. Alternative geometries which may be utilized in the method of the present invention are axial flux, or pancake, motors, radial flux geometries in which the rotor is external to the stator, or geometries which use a combination of axial and radial flux, or multiple axial flux paths. Of particular interest is the latter geometry, wherein a dual-sided pancake stator is surrounded on both faces by pancake rotor.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

What I claim as my invention is:

1. An electrical rotating apparatus comprising:
   a) a stator comprising a plurality of slots and windings;
   b) an inverter system for supplying an alternating current output having more than three phases to the windings;
   c) a rotor electromagnetically coupled to a magnetic field generated by said windings; and
   d) a signal generator generating a pulse modulated drive waveform signal having a pulsing frequency, wherein said pulse modulated drive waveform signal drives said inverter system, wherein a rotating magnetic field produced by said pulsing frequency rotates in synchrony with said rotor, and wherein said pulse modulated drive waveform signal is modulated to obtain an approximation of a desired sine wave, and wherein said pulsing frequency is synchronized with said desired sine wave.

2. The electrical rotating apparatus of claim 1, wherein said signal generator generates said pulse modulated drive waveform signal for each of said number of phases.

3. The electrical rotating apparatus of claim 1, wherein said pulse modulated drive waveform signal is selected from the group consisting of: pulse width modulated signal and pulse amplitude modulated signal.

4. The electrical rotating apparatus of claim 1, further comprising a switching element, wherein said switching element controls said pulsing frequency and modulates said pulse modulated drive waveform signal.

5. The electrical rotating apparatus of claim 1, further comprising a feedback system.

6. The electrical rotating apparatus of claim 5, wherein said feedback system adjusts voltage of said pulse modulated drive waveform signal, synchronizing said rotational magnetic field produced by said pulsing frequency with said rotating frequency of said rotor as said frequency of said rotor changes.

7. The electrical rotating apparatus of claim 5, wherein said pulsing frequency is adjusted to equal said rotating frequency of said rotor times the number of poles in said rotating magnetic field produced by said pulsing frequency, divided by two.

8. The electrical rotating apparatus of claim 1, wherein said stator is comprised of a plurality of slots, wherein said plurality of slots have windings in said slots.

9. The electrical rotating apparatus of claim 8, wherein said plurality of slots are arranged in multiple subsets of three.

10. The electrical rotating apparatus of claim 8, wherein said windings are full span concentrated windings.

11. The electrical rotating apparatus of claim 1, wherein said windings are connected using a mesh connection.

12. The electrical rotating apparatus of claim 1, wherein said inverter system is comprised of inverters, wherein said inverters are half bridge inverters.

13. The electrical rotating apparatus of claim 1, wherein said inverter system outputs eighteen or more phases.

14. The electrical rotating apparatus of claim 1, wherein said inverter system outputs thirty six or more phases.

15. A method of operating the electrical rotating apparatus of claim 1 comprising:
   a) providing an inverter system that outputs more than three phases of alternating current;
   b) electromagnetically coupling a rotor to a magnetic field generated by a stator;
   c) generating a pulse modulated drive waveform signal with a pulsing frequency from a signal generator; and
   d) driving said inverter system with said pulse modulated drive waveform signal, wherein a rotational magnetic field produced by said pulsing frequency is synchronized with a rotating frequency of said rotor, and wherein said pulse modulated drive waveform signal is modulated to obtain an approximation of a desired sine wave, and wherein said pulsing frequency is synchronized said desired sine wave.

16. The electrical rotating apparatus of claim 1, wherein said apparatus is operated in a non-linear region of a saturation curve of said stator.

17. The electrical rotating apparatus of claim 1, wherein said apparatus is operated at densities greater than 130,000 lines per square inch (2.02 Tesla).

18. The electrical rotating apparatus of claim 1, wherein said apparatus is operated at densities greater than 150,000 lines per square inch (2.33 Tesla).

19. The electrical rotating apparatus of claim 1, wherein said pulse modulated drive waveform signal drives said inverter system and said pulse modulated drive waveform signal is fed to said inverter system through at least one signal delay device.

20. The electrical rotating apparatus of claim 19, wherein said pulse modulated drive waveform signal is selected from the group consisting of: a digital signal and an analog signal.

21. The electrical rotating apparatus of claim 19, wherein said signal delay device is a shift register.

22. The electrical rotating apparatus of claim 19, wherein said signal delay device is coupled to a clock, and said clock is further coupled to said signal generator.

23. The electrical rotating apparatus of claim 22, wherein a speed of said apparatus is adjusted by changing a speed of said clock.

24. The electrical rotating apparatus of claim 23, wherein said clock does not have a fixed frequency.

25. An electrical rotating apparatus comprising:
   a) an inverter system that outputs a number of phases of alternating current, wherein said number of phases is more than three;
   b) a stator electrically coupled to said inverter system;
   c) a rotor electromagnetically coupled to a magnetic field generated by said stator; and
   d) a signal generator that modulates a carrier waveform having a pulsing frequency to provide a pulse-modulated drive waveform signal to said inverter system, said drive waveform signal having a fundamental frequency, wherein said pulsing frequency is in fixed phase relation to said fundamental frequency, further wherein said signal generator also generates a second drive waveform signal corresponding to a harmonic, wherein said second drive waveform signal also drives said inverter system.

26. The electrical rotating apparatus of claim 25, wherein said second drive waveform signal is an odd harmonic that is less than or equal to the number of phases.

27. The electrical rotating apparatus of claim 25, further comprising a plurality of drive waveform signals that drive said inverter system, wherein the number of plurality of drive waveform signals and said first and second drive waveform signals is less than said number of phases.

28. The electrical rotating apparatus of claim 25, wherein said second drive waveform signal is the third harmonic.

29. The electrical rotating apparatus of claim 25, wherein said apparatus is operated in a non-linear region of a saturation curve of said stator.

30. The electrical rotating apparatus of claim 25, wherein said apparatus is operated at densities greater than 130,000 lines per square inch (2.02 Tesla).

31. The electrical rotating apparatus of claim 25, wherein said apparatus is operated at densities greater than 150,000 lines per square inch (2.33 Tesla).

32. The electrical rotating apparatus of claim 25, wherein said pulse modulated drive waveform signal drives said inverter system and said pulse modulated drive waveform signal is fed to said inverter system through at least one signal delay device.

33. The electrical rotating apparatus of claim 32, wherein said pulse modulated drive waveform signal is selected from the group consisting of: a digital signal and an analog signal.

34. The electrical rotating apparatus of claim 32, wherein said signal delay device is a shift register.

35. The electrical rotating apparatus of claim 32, wherein said signal delay device is coupled to a clock, and said clock is further coupled to said signal generator.

36. The electrical rotating apparatus of claim 35, wherein a speed of said apparatus is adjusted by changing a speed of said clock.

37. The electrical rotating apparatus of claim 36, wherein said clock does not have a fixed frequency.

38. The electrical rotating apparatus of claim 25, wherein said inverter system comprises at least one module, wherein said at least one module comprises an inverter.

39. The electrical rotating apparatus of claim 38, wherein said inverter system comprises at least two modules.

40. The electrical rotating apparatus of claim 38, wherein the number of modules is less than or equal to the number of phases output from said inverter system.

41. The electrical rotating apparatus of claim 38, wherein the number of modules equals the number of phases output from said inverter system.

42. The electrical rotating apparatus of claim 38, wherein said at least one module comprises at least one controlled switch.

43. The electrical rotating apparatus of claim 42, wherein said at least one controlled switch is a transistor.

44. The electrical rotating apparatus of claim 38, wherein said at least one module further comprises a signal delay device.

45. The electrical rotating apparatus of claim 38, wherein said at least one module comprises a controlled switch and a signal delay device.

46. The electrical rotating apparatus of claim 25, whereby said windings are grouped into a plurality of three phase groups, wherein said plurality of three phase groups is equal to the number of phases divided by three.

47. The electrical rotating apparatus of claim 46, wherein at least one of said plurality of three phase groups of windings is capable of being shut off wherein the rest of said plurality of three phase groups are not shut off.

48. The electrical rotating apparatus of claim 25, whereby the driven windings are arranged in at least one set of an odd integer number of windings, wherein said odd integer number of windings is the largest odd integer that divides into said number of phases evenly and divides into 360 evenly.

49. The electrical rotating apparatus of claim 25, wherein said second drive waveform signal is selected from the group consisting of: third harmonic and fifth harmonic.

50. The electrical rotating apparatus of claim 25, wherein said stator is wound using a mesh connection.

51. The electrical rotating apparatus of claim 25, wherein drive waveform signal is described by the equation $A*\sin(t)+Bn*\sin(nt+p)$.

52. An electrical rotating apparatus comprising:
 a) a stator comprising a plurality of slots and full span concentrated windings;
 b) an inverter system for supplying an output having more than three phases of alternating current to the windings;
 c) a signal generator that modulates a carrier waveform having a pulsing frequency to provide a pulse modulated drive waveform signal to said inverter system, said drive waveform signal having a fundamental frequency, wherein said pulsing frequency is in fixed phase relation to said fundamental frequency.

53. The electrical rotating apparatus of claim 52, wherein said pulsing frequency is less than said number of phases multiplied by said fundamental frequency.

54. The electrical rotating apparatus of claim 52, wherein said pulsing frequency of said drive waveform signal is equal to an even multiple of said number of phases.

55. The electrical rotating apparatus of claim 52, wherein said pulsing frequency of said drive waveform signal is equal to twice said number of phases multiplied by said fundamental frequency.

56. The electrical rotating apparatus of claim 52, wherein said plurality of slots are arranged in multiple subsets of three.

57. The electrical rotating apparatus of claim 52, wherein said windings are regular spaced windings.

58. The electrical rotating apparatus of claim 52, wherein said windings are arranged in a plurality of three phase groups, wherein the windings in each three phrase group are arranged 120 electrical degrees apart.

59. The electrical rotating apparatus of claim 52, wherein said windings are arranged in a plurality of six phase groups arranged 60 electrical degrees apart.

60. The electrical rotating apparatus of claim 52, wherein said inverter system comprises half bridge inverters.

61. The electrical rotating apparatus of claim 52, wherein said inverter system comprises full bridge inverters.

62. The electrical rotating apparatus of claim 52, wherein said inverter system outputs twelve or more phases.

63. The electrical rotating apparatus of claim 52, wherein said inverter system outputs eighteen or more phases.

64. The electrical rotating apparatus of claim 52, wherein said drive waveform signal is a pulse width modulated signal.

65. The electrical rotating apparatus of claim 64, wherein said pulse width modulated signal is regular.

66. The electrical rotating apparatus of claim 64, wherein said pulse width modulated signal is irregular.

67. The electrical rotating apparatus of claim 64, wherein said pulse width modulated signal is a square wave, a full square wave, or a duty cycle modulated square wave.

68. The electrical rotating apparatus of claim 64, wherein said inverter system comprises half bridge inverters, and half of said windings in said stator are driven and the other half of said windings in said stator are connected to a star point.

69. The electrical rotating apparatus of claim 52, wherein said pulsing frequency comprises harmonic components, wherein said harmonic components act in synchronism with said fundamental frequency.

70. The electrical rotating apparatus of claim 69, wherein said harmonic components produce torques in the direction of rotation.

71. An electrical rotating induction apparatus comprising:
   a) a stator comprising a plurality of slots occupied by full span concentrated windings;
   b) an inverter system for synthesizing more than three phases of alternating current;
   c) a signal generator for generating a drive waveform signal characterized by a fundamental frequency and a pulsing frequency;
   d) and means for synchronizing the pulsing frequency as a multiple of the fundamental frequency.

72. The electrical rotating apparatus of claim 71, wherein said inverter system outputs more than two phases.

73. The electrical rotating apparatus of claim 71, wherein said inverter system outputs more than three phases.

74. The electrical rotating apparatus of claim 71, wherein said inverter system outputs twelve or more phases.

75. The electrical rotating apparatus of claim 71, wherein said inverter system outputs eighteen or more phases.

76. The electrical rotating apparatus of claim 71, wherein a length of a representation of said drive waveform signal increases as the number of phases increases.

77. The electrical rotating apparatus of claim 71, wherein said drive waveform signal is a digital signal.

78. The electrical rotating apparatus of claim 71, wherein said drive waveform signal is an analog signal.

79. The electrical rotating apparatus of claim 71, further wherein said drive waveform signal is inverted and drives one half or fewer of inverters in said inverter system.

80. The electrical rotating apparatus of claim 71, wherein a speed of said apparatus is adjusted by changing a frequency of said signal generator.

81. The electrical rotating apparatus of claim 71, wherein said pulsing frequency comprises harmonic components, wherein said harmonic components act in synchronism with said fundamental frequency.

82. The electrical rotating apparatus of claim 71, wherein said apparatus is operated at magnetic flux densities greater than 130,000 lines per square inch (2.02 Tesla).

83. The electrical rotating apparatus of claim 71, wherein said apparatus is operated at magnetic flux densities greater than 150,000 lines per square-inch (2.33 Tesla).

84. The electrical rotating apparatus of claim 71, further comprising at least two signal delay devices connected in parallel.

85. The electrical rotating induction apparatus of claim 71 further comprising at least one signal delay device electrically connected to said signal generator and to said inverter system, for receiving signals from said signal generator and for delaying the signals to provide time-delayed versions thereof to said inverter system.

86. The electrical rotating apparatus of claim 85, wherein said signal delay device is a shift register.

87. The electrical rotating apparatus of claim 85, wherein said signal delay device comprises a clock.

88. The electrical rotating apparatus of claim 87, wherein a speed of said apparatus is adjusted by changing a speed of said clock.

89. The electrical rotating apparatus of claim 87, wherein said clock does not have a fixed frequency.

90. A method of operating an electrical rotating apparatus comprising:
   a) generating a drive waveform signal having a pulsing component and a fundamental component;
   b) synchronizing the frequency of the pulsing component to be in a fixed phase relation to the fundamental component;
   c) synthesizing more than three inverter phases of alternating current;
   d) supplying said phases to windings of a stator of the electrical rotating apparatus, wherein the windings are concentrated and arranged in a full span configuration;
   e) and driving a rotor by electromagnetically connecting the rotor to a magnetic field generated by the stator.

91. The method of claim 90, further comprising: operating said apparatus in a non-linear region of a saturation curve of said stator.

92. The method of claim 90, further comprising: operating said apparatus at magnetic flux densities greater than 130,000 lines per square inch (2.02 Tesla).

93. The method of claim 90 wherein the step of synchronizing the frequency of the pulsing component to be in fixed phase relation to the frequency of the fundamental component comprises varying the frequency of the pulsing component to be in fixed phase relation with a varying frequency of the fundamental component.

94. The method of claim 90 further including the step of processing signals from the signal generator to output a plurality of time-delayed versions of the signals.

* * * * *